(12) United States Patent
Zhang et al.

(10) Patent No.: US 10,498,673 B2
(45) Date of Patent: Dec. 3, 2019

(54) DEVICE AND METHOD FOR PROVIDING USER-CUSTOMIZED CONTENT

(71) Applicant: SAMSUNG ELECTRONICS CO., LTD., Suwon-si (KR)

(72) Inventors: Ran Zhang, Beijing (CN); Qinghua Wu, Beijing (CN); Xiaoyan Lou, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 15/373,591

(22) Filed: Dec. 9, 2016

(65) Prior Publication Data

US 2017/0171121 A1 Jun. 15, 2017

(30) Foreign Application Priority Data

Dec. 9, 2015 (CN) .......................... 2015 1 0901427
Nov. 7, 2016 (KR) ........................ 10-2016-0147637

(51) Int. Cl.
*H04L 12/58* (2006.01)
*H04L 29/08* (2006.01)
(Continued)

(52) U.S. Cl.
CPC .............. *H04L 51/02* (2013.01); *G06F 17/27* (2013.01); *G06Q 10/107* (2013.01); *H04L 51/04* (2013.01);
(Continued)

(58) Field of Classification Search
CPC ......... H04L 51/04; H04L 51/02; H04L 67/22; H04L 67/36; H04L 51/32; H04L 51/066; H04L 51/046; G06F 17/27; G06Q 10/107
See application file for complete search history.

(56) References Cited

U.S. PATENT DOCUMENTS 7,487,456 B2  2/2009  Brooke et al.
8,688,489 B2  4/2014  Bhogal et al.
(Continued)

FOREIGN PATENT DOCUMENTS

CN  104836916 A  8/2015
CN  102624637 B  2/2016
(Continued)

OTHER PUBLICATIONS

International Search Report and Written Opinion (PCT/ISA/220, PCT/ISA/210, & PCT/ISA/237), dated Feb. 27, 2017 by International Searching Authority in International Application No. PCT/KR2016/014356.
(Continued)

*Primary Examiner* — Ramy M Osman
(74) *Attorney, Agent, or Firm* — Sughrue Mion, PLLC

(57) ABSTRACT

A device and a method for providing user-customized content are provided. The method, performed by the device, of providing information regarding at least one primary chat window includes: acquiring a plurality of messages included in at least one primary chat window; determining that a specific event has occurred, based on the acquired plurality of messages; generating a secondary chat window for informing a user of the device about the occurred event; and displaying guidance information about the occurred event in the secondary chat window.

14 Claims, 25 Drawing Sheets

(51) Int. Cl.
*G06F 17/27* (2006.01)
*G06Q 10/10* (2012.01)

(52) U.S. Cl.
CPC ............ *H04L 51/066* (2013.01); *H04L 51/32* (2013.01); *H04L 67/22* (2013.01); *H04L 67/36* (2013.01)

(56) References Cited

U.S. PATENT DOCUMENTS

| | | | |
|---|---|---|---|
| 8,903,716 | B2 | 12/2014 | Chen et al. |
| 8,930,481 | B2 | 1/2015 | Zhang et al. |
| 8,996,625 | B1* | 3/2015 | Singleton ................ H04L 51/32 |
| | | | 707/771 |
| 9,419,924 | B2 | 8/2016 | Ye |
| 9,860,200 | B1* | 1/2018 | Braun .................. H04L 51/046 |
| 10,158,593 | B2* | 12/2018 | Pfriem .................... H04L 51/04 |
| 10,218,651 | B2* | 2/2019 | Schubert ................ H04L 67/22 |
| 2008/0263157 | A1* | 10/2008 | Bhogal ................ G06Q 10/107 |
| | | | 709/206 |
| 2009/0094343 | A1* | 4/2009 | Mehrotra ................ G06F 15/16 |
| | | | 709/207 |
| 2009/0245500 | A1* | 10/2009 | Wampler .......... H04M 3/42382 |
| | | | 379/265.09 |
| 2009/0254624 | A1* | 10/2009 | Baudin ................ G06Q 10/107 |
| | | | 709/206 |
| 2010/0211646 | A1* | 8/2010 | McDevitt ................ H04L 51/04 |
| | | | 709/206 |
| 2010/0240402 | A1* | 9/2010 | Wickman ................ H04M 1/57 |
| | | | 455/466 |
| 2012/0022892 | A1* | 1/2012 | Feldman ................ G06Q 50/22 |
| | | | 705/3 |
| 2012/0023113 | A1* | 1/2012 | Ferren ............... G06F 17/30867 |
| | | | 707/751 |
| 2012/0064924 | A1* | 3/2012 | Schapsis ................ H04L 51/02 |
| | | | 455/466 |
| 2012/0079020 | A1 | 3/2012 | Park et al. |
| 2012/0271676 | A1 | 10/2012 | Aravamudan et al. |
| 2013/0031476 | A1 | 1/2013 | Coin et al. |
| 2013/0218997 | A1 | 8/2013 | Kwon et al. |
| 2014/0004889 | A1* | 1/2014 | Davis ..................... H04L 51/02 |
| | | | 455/466 |
| 2014/0184544 | A1* | 7/2014 | Lim ..................... H04L 51/066 |
| | | | 345/173 |
| 2014/0207882 | A1 | 7/2014 | Joo et al. |
| 2014/0359487 | A1 | 12/2014 | Lee |
| 2015/0032724 | A1* | 1/2015 | Thirugnanasundaram .................. H04L 51/02 |
| | | | 707/722 |
| 2015/0178371 | A1* | 6/2015 | Seth et al. ........... G06Q 10/107 |
| | | | 707/748 |
| 2015/0207765 | A1* | 7/2015 | Brantingham ........ H04L 51/046 |
| | | | 715/758 |
| 2015/0347919 | A1* | 12/2015 | Bastide ................... H04L 51/16 |
| | | | 706/52 |
| 2016/0147387 | A1* | 5/2016 | Rahman ............ G06F 17/30705 |
| | | | 715/752 |
| 2016/0217119 | A1* | 7/2016 | Dakin ................... G06F 17/276 |
| 2016/0224524 | A1* | 8/2016 | Kay ...................... G06F 17/276 |
| 2016/0359771 | A1* | 12/2016 | Sridhar ................. H04L 51/02 |
| 2017/0048378 | A1* | 2/2017 | Rubinstein ............. H04L 51/02 |
| 2017/0171121 | A1* | 6/2017 | Zhang ..................... H04L 51/04 |

FOREIGN PATENT DOCUMENTS

| | | |
|---|---|---|
| CN | 103902630 B | 8/2017 |
| EP | 2 632 184 A2 | 8/2013 |
| EP | 2 632 184 A3 | 8/2014 |
| JP | 2013-134777 A | 7/2013 |
| KR | 100693754 B1 | 3/2007 |
| KR | 10-2014-0094282 A | 7/2014 |
| KR | 10-2015-0027389 A | 3/2015 |

OTHER PUBLICATIONS

Communication dated Jul. 13, 2018 by the European Patent Office in counterpart European Patent Application No. 16873348.3.
Communication dated Apr. 2, 2019, issued by the State Intellectual Property Office of P.R. China in counterpart Chinese Application No. 201510901427.3.

* cited by examiner

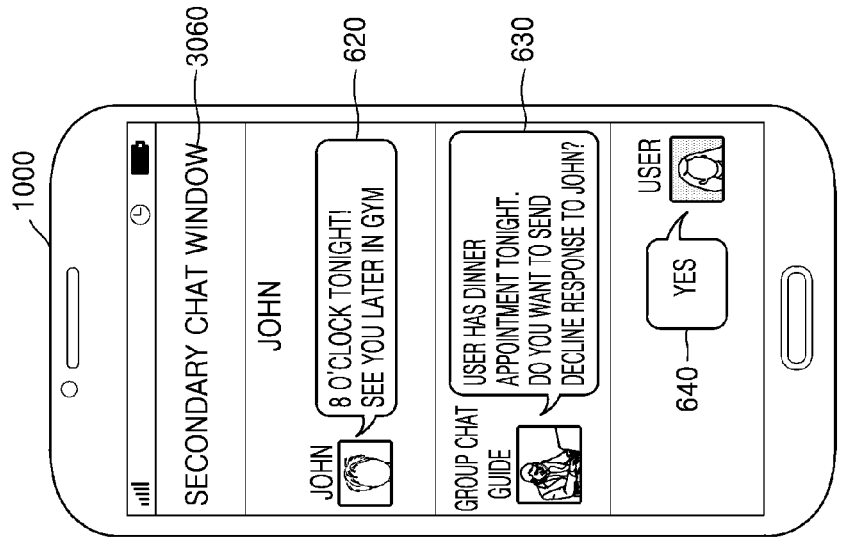
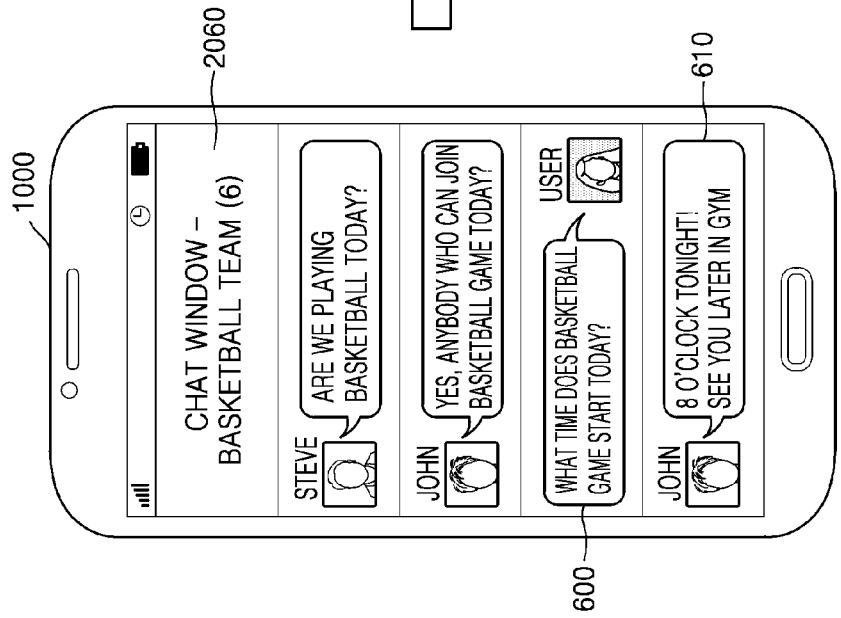

(a)

(b)

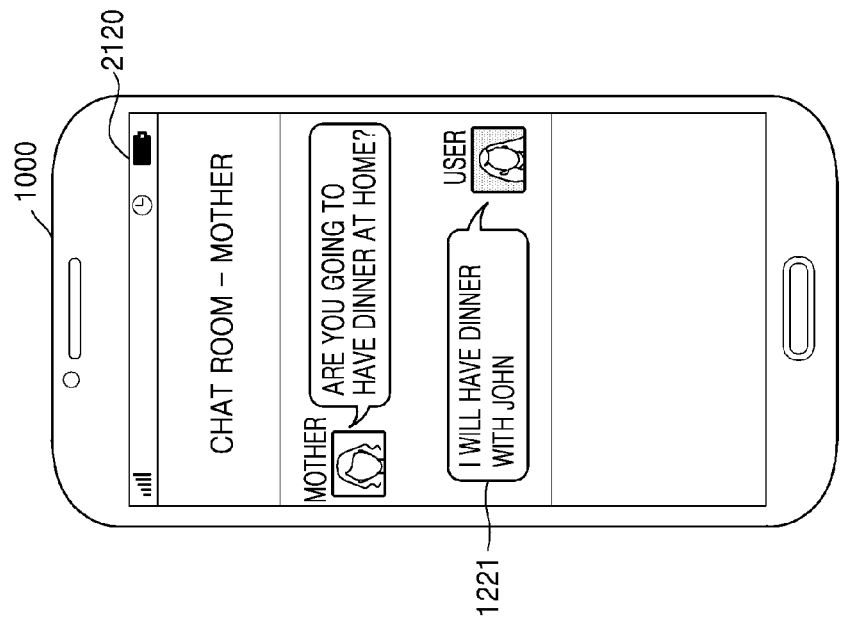
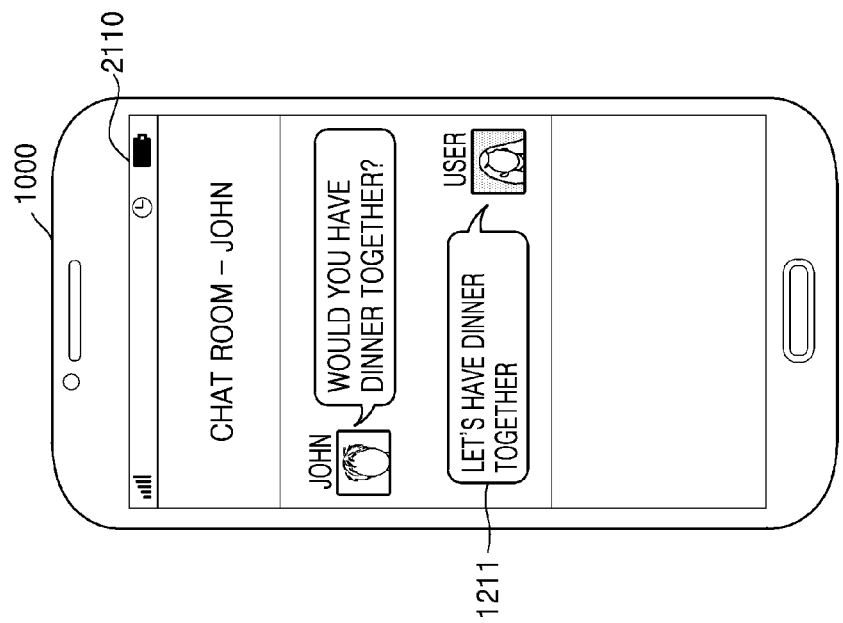

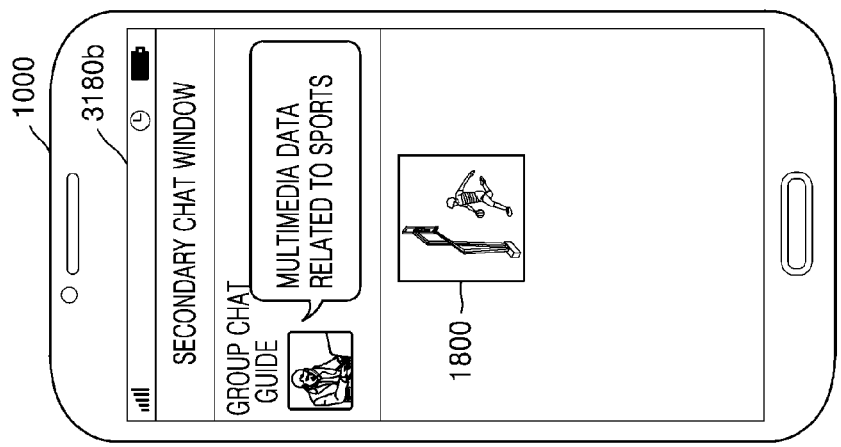
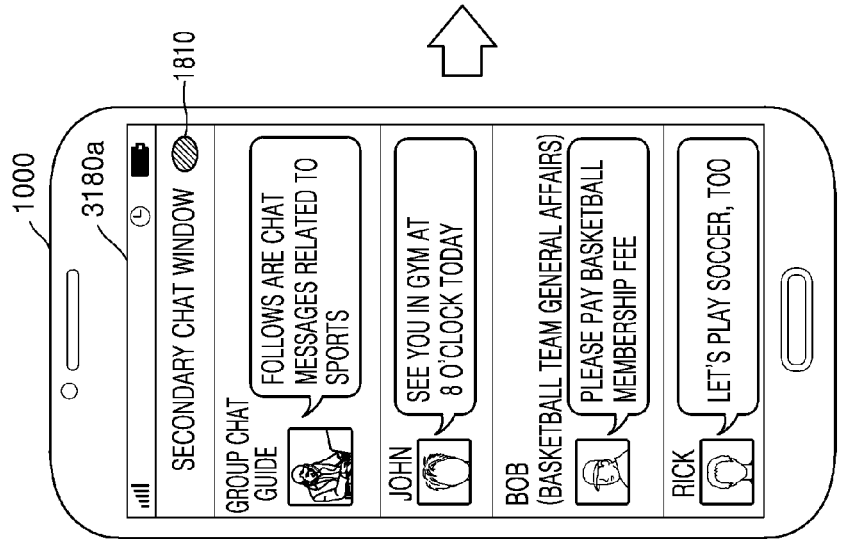
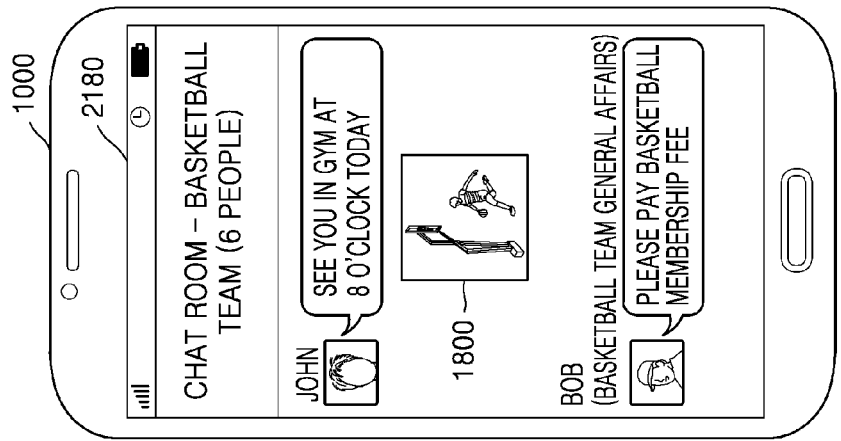

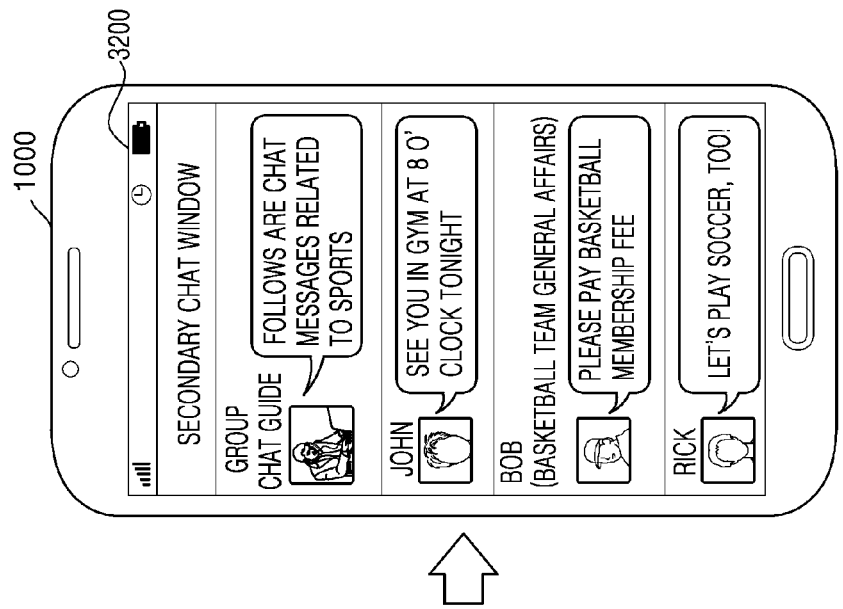
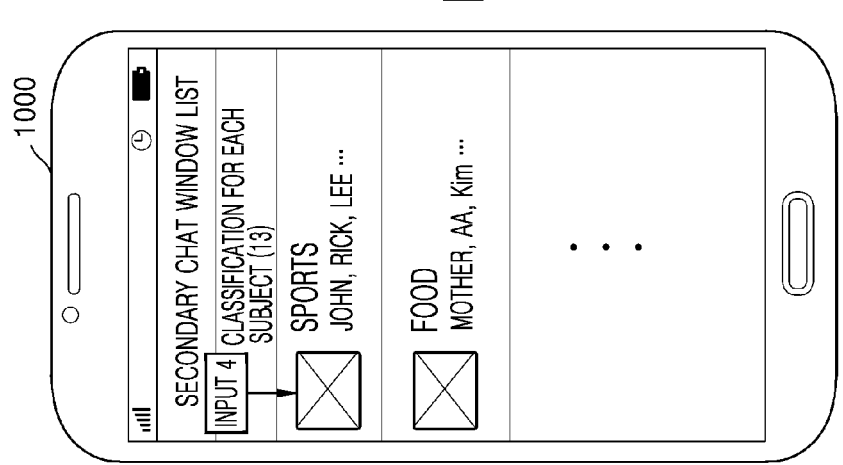
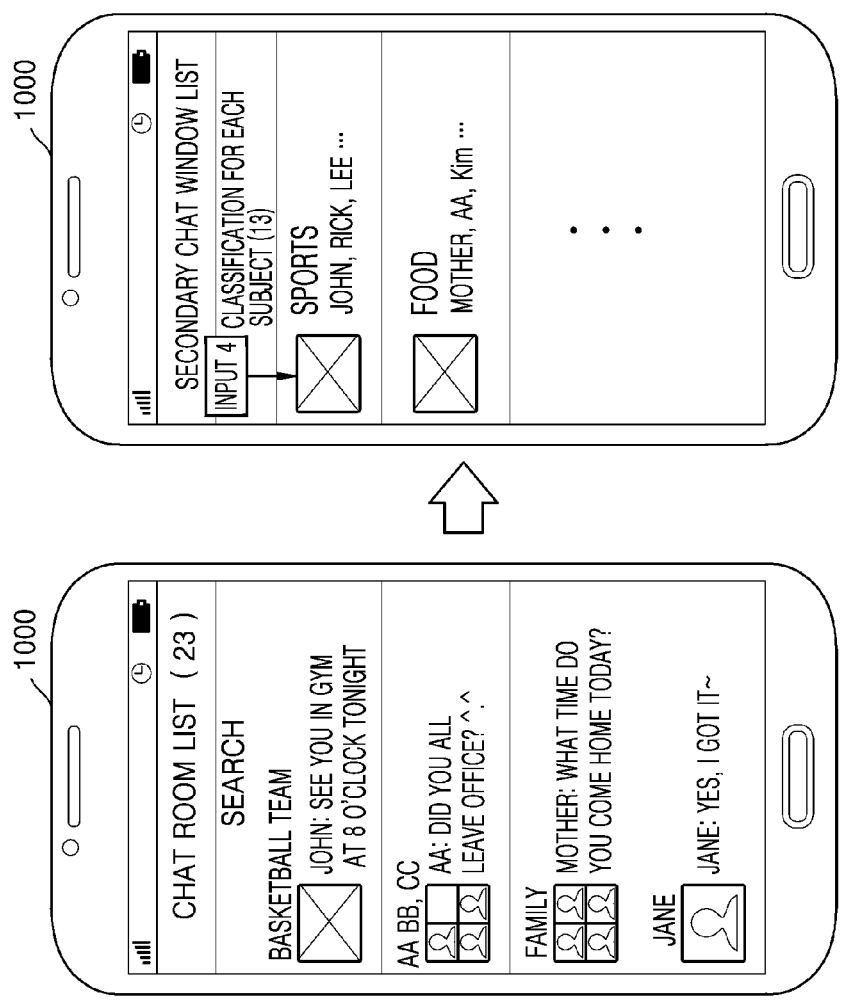

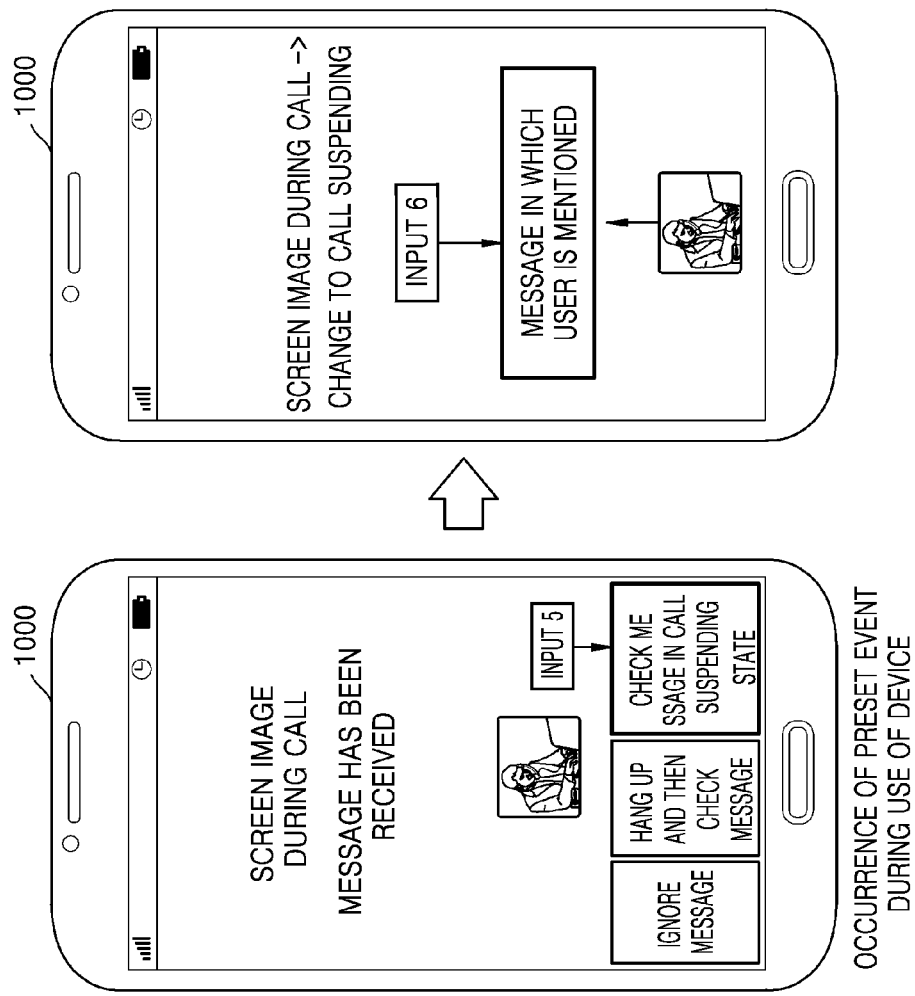

DEVICE AND METHOD FOR PROVIDING USER-CUSTOMIZED CONTENT

CROSS-REFERENCE TO RELATED APPLICATIONS

This application claims priority from Chinese Patent Application No. 201510901427.3, filed on Dec. 9, 2015 in the State Intellectual Property Office (SIPO) of the People's Republic of China, and Korean Patent Application No. 10-2016-0147637, filed on Nov. 7, 2016 in the Korean Intellectual Property Office, the disclosures of which are incorporated herein in their entireties by reference.

BACKGROUND

1. Field

Apparatuses and methods consistent with exemplary embodiments relate to providing user-customized content, and more particularly, to providing, to a user, information regarding a message to be transmitted and received through a plurality of chat windows.

2. Description of the Related Art

Through developments in multimedia and network technologies, a user may communicate with other users more conveniently than ever by using various computing devices. The user can conveniently acquire a vast quantity of content from other users by using these devices, but it is sometimes difficult for the user to effectively sift through the vast amount of information acquired from the received messages. Accordingly, there is a demand for a technique for providing user-customized content and enabling a user to efficiently acquire necessary information.

SUMMARY

One or more exemplary embodiments provide a device and a method for providing information regarding at least one primary chat window.

According to an aspect of an exemplary embodiment, there is provided a method including: acquiring a plurality of messages included in at least one primary chat window; determining that a specific event has occurred, based on the acquired plurality of messages; generating a secondary chat window for informing a user of the device about the occurred event; and displaying guidance information about the occurred event in the secondary chat window.

According to an aspect of another embodiment, there is provided a device including: a display; a processor; and a memory configured to store instructions which, when executed by the processor, cause the processor to provide information regarding at least one primary chat window through the display, acquire a plurality of messages included in the at least one primary chat window, determine, based on the acquired plurality of messages, that a specific event has occurred, generate a secondary chat window for informing a user about the occurred event, and display guidance information about the occurred event in the secondary chat window.

According to an aspect of another exemplary embodiment, there is provided a non-transitory computer-readable recording medium having recorded thereon a computer-readable program for executing the method.

BRIEF DESCRIPTION OF THE DRAWINGS

The above and/or other aspects will become apparent and more readily appreciated from the following description of exemplary embodiments, taken in conjunction with the accompanying drawings in which:

FIGS. 6A and 6B illustrate the device providing a comment message based on a user schedule, according to some exemplary embodiments;

FIGS. 12A and 12B illustrate displaying, in chat windows, final response messages determined according to the recommended response message of FIG. 11, according to some exemplary embodiments;

FIGS. 18A, 18B and 18C illustrate illustrates the device displaying, in a secondary chat window, multimedia content included in a chat window, according to some exemplary embodiments;

FIGS. 22A, 22B and 22C illustrate classifying messages included in a chat window for each category and generating a secondary chat window for each category, according to some exemplary embodiments;

FIGS. 23A, 23B and 23C illustrate the device displaying a secondary chat window when a preset event occurs while performing a predetermined operation, according to some exemplary embodiments.

DETAILED DESCRIPTION

Figure 1:
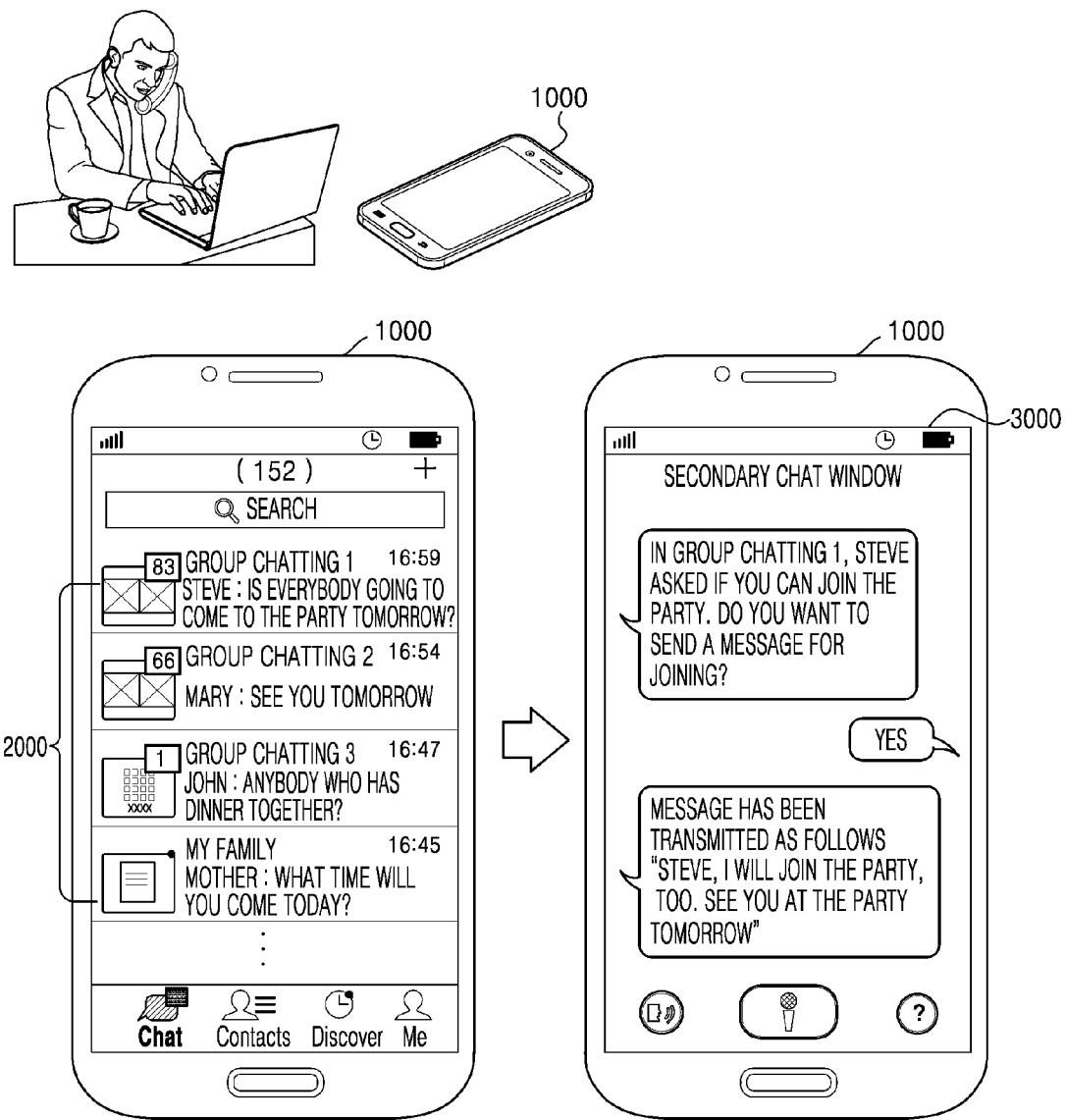
FIG. 1 illustrates displaying, in a secondary chat window, information regarding messages in a primary chat window, according to some exemplary embodiments.

Reference will now be made in detail to exemplary embodiments, with reference to the accompanying drawings. In the drawings, parts irrelevant to the description are omitted to clearly describe the exemplary embodiments, and like reference numerals refer to like elements throughout the specification. In this regard, the present exemplary embodiments may have different forms and should not be construed as being limited to the descriptions set forth herein.

Throughout the specification, when it is described that a certain element is "connected" to another element, it should be understood that the certain element may be "directly connected" to another element or "electrically connected" to another element via another element in the middle. In addition, when a component "includes" an element, unless there is another opposite description thereto, it should be understood that the component does not exclude another element but may further include another element.

As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure is described in detail with reference to the accompanying drawings.

FIG. 1 illustrates displaying, in a secondary chat window 3000, information regarding messages in a primary chat window, according to some exemplary embodiments.

As shown in FIG. 1, a device 1000 may transmit and receive messages to and from other devices through at least one chat window (i.e., a primary chat window) provided by a chat application installed in the device 1000, analyze the messages in the chat window, and provide information regarding the analyzed messages to a user of the device 1000 by using the secondary chat window 3000.

The device 1000 may display a chat window list 2000 on a screen, and the chat window list 2000 may include an identification value (i.e., label or tag) of at least one chat window. A chat window may be a message window provided by a chat application and generated and provided for each group but is not limited thereto.

The device 1000 may display, in a secondary chat window 3000, information regarding messages in the at least one chat window included in the chat window list 2000. The device 1000 may analyze the messages in the at least one chat window, generate guidance information about the messages in the at least one chat window, and display the generated guidance information in the secondary chat window 3000. The guidance information may be information for informing the user about messages in a primary chat window and receiving feedback from the user. The device 1000 may generate the secondary chat window 3000 for displaying the guidance information and display the guidance information in the secondary chat window 3000 in an interactive form. The guidance information may include a summary message and a comment message with respect to messages in a primary chat window but is not limited thereto. The summary message may be a message generated by summarizing a plurality of messages in a primary chat window, and the comment message may be a message indicating a comment related to a plurality of messages in a primary chat window. In addition, the device 1000 may receive a user input through the secondary chat window 3000 and generate a recommended response message based on the received user input.

The device 1000 may be, for example, a smartphone, a personal computer (PC), a tablet PC, a smart TV, a cellular phone, a personal digital assistant (PDA), a laptop computer, a media player, a micro-server, a global positioning system (GPS) device, an e-book terminal, a digital broadcast terminal, a navigation machine, a kiosk, an MP3 player, a digital camera, a wearable device, another mobile or non-mobile computing device but is not limited thereto. Alternatively, the device 1000 may include various devices, such as an electronic blackboard and a touch table capable of receiving a touch input. Alternatively, the device 1000 may be a watch, eye glasses, a hairband, or a ring having a communication function and a data processing function.

Figure 2:
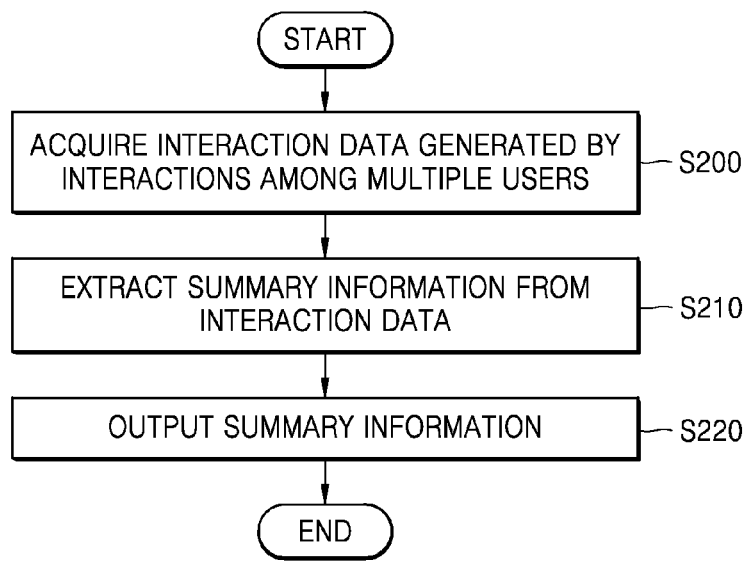
FIG. 2 is a flowchart of a method by which a device processes interaction data, according to some exemplary embodiments.

FIG. 2 is a flowchart of a method by which the device 1000 processes interaction data, according to some exemplary embodiments.

In operation S200, the device 1000 may acquire interaction data generated by interactions among multiple users. For example, the interaction data may be data transmitted and received among users through a chat application. The device 1000 may acquire interaction data among multiple users from data recorded in chat software or other software that includes text. The interaction data may be acquired by the device 1000 or an interaction data processing device. The device 1000 or the interaction data processing device may acquire the interaction data by monitoring real-time or non-real-time interaction data.

In operation S210, the device 1000 may extract summary information from the interaction data. The device 1000 may extract summary information corresponding to important information from the interaction data. The important information may include subject information, contact information, group information, a relationship with a contact, urgency of the interaction data, and/or a correlation between a user and the interaction data. The relationship with a contact may be acquired by analyzing information related to the contact and/or an interaction history with the contact, where the information related to the contact may include contact information in an address book, a schedule related to the contact in a scheduling table and/or memorandum, or contact information in a social network application. The interaction history with the contact may include a call history with the contact, a short message history with the contact, an email history with the contact, and/or an interaction history with the contact in other social network applications.

In addition, the device 1000 may classify the summary information according to at least one piece of information among an interaction time of the interaction data, a matter of interest of the user, a relationship with the contact, an appointment of the contact in the summary information, and an appointment of the user in the summary information and extract the classified summary information.

For example, when the important information is subject information, the device 1000 may display the important information in an order determined according to the popularity of each subject, a correlation between the user and each subject, importance of the user in each subject, and/or a predetermined subject. As another example, when the important information is contact information, the device 1000 may display the important information in an order determined according to a contact frequency with the contact, a relationship with the contact, and/or a predetermined contact.

A correlation between a subject and the matter of interest of the user may be acquired by analyzing an activity history of the user and determining the correlation between the subject and the matter of interest of the user. The activity history may include searching for contacts, clicking on contacts, transmitting contacts, and/or editing contacts.

According to an exemplary embodiment, the important information may include predetermined event information, and the device 1000 may extract summary information corresponding to the predetermined event information from the interaction data. The predetermined event information may include predetermined content mentioned in the interaction data, responded predetermined content, information regarding a predetermined contact who has transmitted interaction content, and/or content related to a predetermined subject.

In operation S220, the device 1000 may output the summary information. The device 1000 may display important information, and then output summary information corresponding to the important information when a user input related to the displayed important information is received. In addition, the device 1000 may output classified summary information.

According to an exemplary embodiment, the device 1000 may output prompt information about a predetermined event, and then output summary information corresponding to the predetermined event when a user input related to the prompt information is detected.

According to another exemplary embodiment, the device 1000 may generate summary information by editing summary content in which interaction data is summarized. Alternatively, the device 1000 may generate summary information by editing summary content corresponding to important information.

The operation in which the device 1000 outputs the summary information may include processing the summary information and outputting the processed summary information, the processing being performed by using a method of acquiring information about each contact corresponding to summary information about interaction data and generating customized summary information corresponding to each contact; a method of generating relevant summary information corresponding to summary content of interaction data; a method of generating multimedia summary information according to text summary information and multimedia information in summary content of interaction data; a method of detecting predetermined content and/or a predetermined contact to be blocked in summary content of interaction data and then blocking data related to the predetermined content and/or the predetermined contact in the summary content; and/or a method of generating summary information about a current situation and/or a current device state according to current situation information and/or current device state information about a terminal device.

In the method of acquiring information about each contact corresponding to summary information about interaction data and generating customized summary information corresponding to each contact, the contact information may include a chat habit of a contact, a relationship between the contact and the user, and/or attribute information about the contact. In addition, the chat habit of the contact may include a word used by the contact with high frequency, a phrase used by the contact with high frequency, a sentence structure used by the contact with high frequency, and/or an expression by the contact with high frequency. In addition, the attribute information about the contact may include a job, an age, a gender, and/or an image of the contact. In addition, the chat habit of the contact may be acquired by analyzing an interaction history with the contact. In addition, the attribute information about the contact may be acquired by analyzing information about the contact and/or the interaction history with the contact.

According to the method of generating relevant summary information corresponding to summary content of interaction data, when content for requesting for responses from a plurality of contact is included in the summary content of the interaction data, responses of the contact may be collected to configure relevant summary information. Alternatively, when content for requesting for a response of the user is included in the summary content of the interaction data, a conflict between the content for requesting for a response of the user and a schedule of the user or a conflict between the content for requesting for a response of the user and a current place is detected, and then relevant summary information including a conflict alert may be generated. Alternatively, when content related to a hot event (e.g., an noteworthy event, an upcoming event, etc.) is included in the summary content of the interaction data, information related to the hot event is searched for, and relevant summary information including retrieved information may be generated.

In the method of generating multimedia summary information according to text summary information and multimedia information in summary content of interaction data, the multimedia summary information may include background music, video, image, speech, and/or text summary information.

The method of generating summary information about a current situation and/or a current device state according to current situation information and/or current device state information about a terminal device may include: determining a current state of the user according to the current situation information and/or the current device state information; and generating summary information including semantic characteristics corresponding to the current state of the user.

According to an exemplary embodiment, the method of FIG. 2 may further include detecting, by the device 1000, a user input on a region related to the output summary information and then moving to a display interface for displaying interaction data corresponding to the summary information. According to an exemplary embodiment, when the summary information corresponds to at least two contact groups, the device 1000 may display interaction data corresponding to the summary information in groups corresponding to the contact groups in the display interface.

According to an exemplary embodiment, the outputting of the summary information extracted from the interaction data may be performed by using a predetermined speech characteristic, outputting summary information corresponding to a contact as a speech by using a speech characteristic of the contact, determining a speech pattern according to a speech characteristic and current situation information and/or current device state information about a terminal device and outputting summary information as a speech by using the speech characteristic and the speaking manner.

In addition, the speech characteristic of the contact may be acquired by collecting speech segments of the contact and acquiring a speech characteristic of the contact from the collected speech segments or by predicting a speech characteristic according to attribute information about the contact and/or an interaction history with the contact.

When a speech characteristic is acquired from collected speech segments, the method of FIG. 2 may include: learning a speech model for synthesis by using the collected speech segments of the contact; and acquiring a speech characteristic customized to the contact.

According to an exemplary embodiment, the device 1000 may analyze interaction data to acquire content for requesting for a response of the user and generate and output a response customized according to the acquired content.

When the device 1000 generates and outputs a response customized according to content for requesting for a response of the user, the device 1000 may process the content for requesting for a response of the user according to a relationship with a contact by which the response is to be received, attribute information about the user, and/or attribute information about the contact by which the response is to be received in order to generate and output the customized response.

When the device 1000 outputs summary information extracted from interaction data, the device 1000 may classify the summary information according to an interaction time of the interaction data, a topic of interest of the user, a relationship with a contact, an appointment of the contact in the summary information, and/or an appointment of the user in the summary information, and output the classified summary information.

Figure 3:
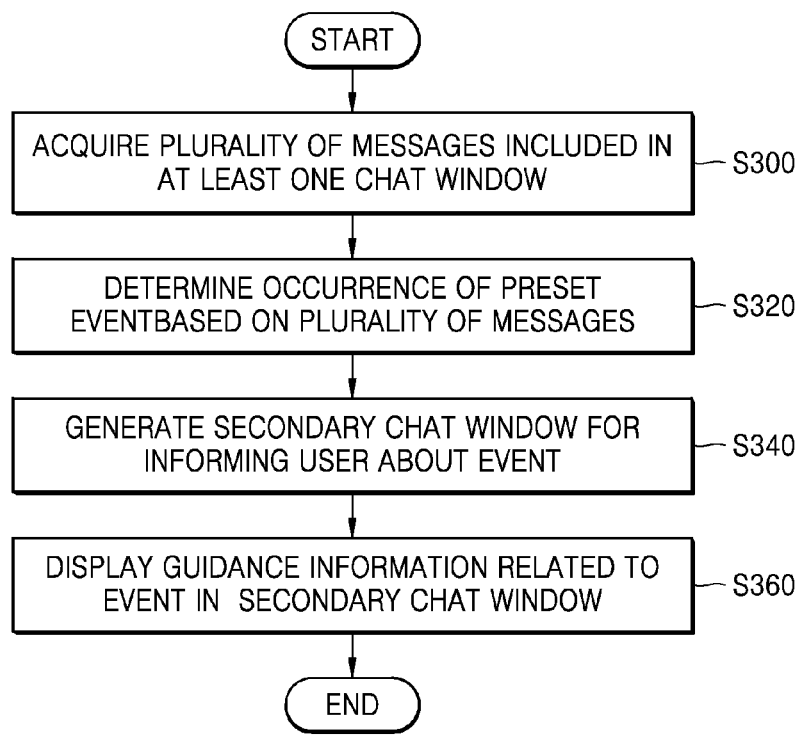
FIG. 3 is a flowchart of a method of providing guidance information about messages in a chat window, according to some exemplary embodiments.

FIG. 3 is a flowchart of a method of providing guidance information about messages in a primary chat window, according to some exemplary embodiments.

In operation S300, the device 1000 may acquire a plurality of messages included in at least one chat window. The device 1000 may transmit and receive messages to and from other devices through a chat window and monitor the messages transmitted and received through the chat window. The device 1000 may identify whether the acquired messages have been read by the user of the device 1000. In addition, the device 1000 may acquire, from a chat window, messages from other devices for a preset time duration.

When a plurality of chat applications are installed in the device 1000, the device 1000 may acquire messages received from other devices by monitoring chat windows provided by the plurality of chat applications.

In operation S320, the device 1000 may determine that a preset event has occurred, based on the acquired plurality of messages. The device 1000 may determine that the preset event has occurred, based on a message received from another device and not read by the user of the device 1000 from among messages in a chat window. The preset event may be preset by the user, and when it is determined that content of a message indicates a preset situation, it may be determined that the preset event has occurred.

For example, the device 1000 may use various natural language analysis schemes to understand the meaning of an acquired message and determine whether the preset event has occurred, based on the meaning of the acquired message. For example, when a message including the name of the user of the device 1000 is received, when a message is received from a preset other user, when a message related to a predetermined subject set by the user is received, when a message related to predetermined content set by the user is received, or when a message is received from some users selected from among users in a chat window, it may be determined that the preset event has occurred, but the present exemplary embodiment is not limited thereto.

In addition, the device 1000 may change the preset event by receiving a user input for changing an event. When the device 1000 determines that the preset event has occurred, from the plurality of messages acquired from the chat window, the device 1000 may proceed to operation S340.

In operation S340, the device 1000 may generate the secondary chat window 3000 for informing the user about the occurred event. The device 1000 may add the user of the device 1000 and the device 1000 itself as participants in the chat room of the secondary chat window 3000, and the user may communicate with the device 1000 in the secondary chat window 3000 as if the device 1000 is another user to communicate with. The device 1000 may match a plurality of primary chat windows with the secondary chat window 3000 and generate the secondary chat window 3000 to inform the user of information regarding events respectively occurring in the plurality of primary chat windows.

When the preset event has occurred, the device 1000 may automatically generate the secondary chat window 3000 but the disclosure is not limited thereto. When the preset event has occurred, the device 1000 may display a graphic user interface (GUI) for asking the user whether the user wishes to receive guidance information through the secondary chat window 3000, and generate the secondary chat window 3000 when a user input for receiving guidance information is input through the GUI.

In operation S360, the device 1000 may display guidance information about the occurred event in the secondary chat window 3000. The guidance information may indicate the occurrence of the event to the user and may include, for example, a summary message for informing the user about the occurred event, a comment message for providing to the user a comment related to the occurred event, search information retrieved by the device 1000 related to the occurred event, and a recommended response message for recommending a response of the user in relation to the event, but the disclosure is not limited thereto.

In addition, the device 1000 may display the guidance information in the secondary chat window 3000 in a form of a chat message to the user. For example, the device 1000 may display a speech bubble including the guidance information in the secondary chat window 3000 together with a predetermined identification value associated with the device 1000. In addition, the device 1000 may receive a user input for inputting a message through the secondary chat window 3000 and input the input message into a chat window corresponding to the input message.

Figure 4:
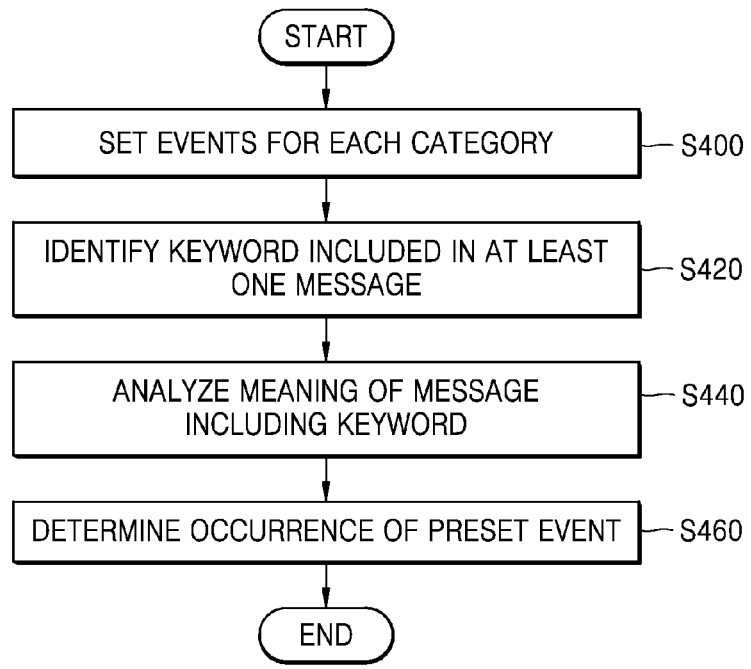
FIG. 4 is a flowchart of a method of determining the occurrence of a preset event in a chat window, according to some exemplary embodiments.

FIG. 4 is a flowchart of a method of determining the occurrence of a preset event in a primary chat window, according to some exemplary embodiments.

In operation S400, the device 1000 may set events for each category. The device 1000 may select a predetermined category by receiving a user input and set a predetermined event related to the selected category. A category may be a criterion for identifying a message type. For example, the category may be identified according to a subject of a dialogue or a subject of a message, such as "food" or "sports." However, the present exemplary embodiment is not limited thereto, and a category may be identified according to, for example, an identify of a user of another device 1000 which has transmitted a message or an operation of the device 1000 requested by a message.

For example, the device 1000 may select a category, "receiving a message", and set an event, "receiving a message from a user A" as a priority event. Even after setting events for each category, the device 1000 may change a category and/or an event by receiving a user input for changing the category and/or the event.

In operation S420, the device 1000 may identify a keyword included in at least one message. The device 1000 may identify at least one keyword from messages acquired from at least one chat window. The device 1000 may identify a keyword from a message according to a set event. In this case, keywords corresponding to events may be assigned for each event.

In operation S440, the device 1000 may analyze the meaning of a message including the keyword. The device 1000 may analyze the meaning of a message that includes a keyword related to an event from among messages in a primary chat window. In addition, the device 1000 may analyze the meaning of the messages displayed immediately before and after the message including a keyword related to an event from among messages in a primary chat window.

In addition, the device 1000 may analyze the meaning of a message by using various natural language analysis schemes. For example, the device 1000 may analyze the meaning of a message by dividing a sentence included in the message, analyze morphemes in the sentence, and/or analyzing vocabulary of words in the sentence, but the disclosure is not limited thereto.

In operation S460, the device 1000 may determine the occurrence of a preset event. The device 1000 may determine whether the preset event has occurred in a primary chat window, based on the meaning of the message, which has been analyzed in operation S440. For example, the device 1000 may determine which category of events a message is related to, based on the meaning of the message and determine which event from among the events in the determined category has occurred based on the message. In addition, for example, when a predetermined keyword is included in a message, the device 1000 may determine that the preset event has occurred. Alternatively, even when a predetermined keyword is included in a message, the device 1000 may determine that the preset event has not occurred, according to the meaning of the message.

Figure 5:
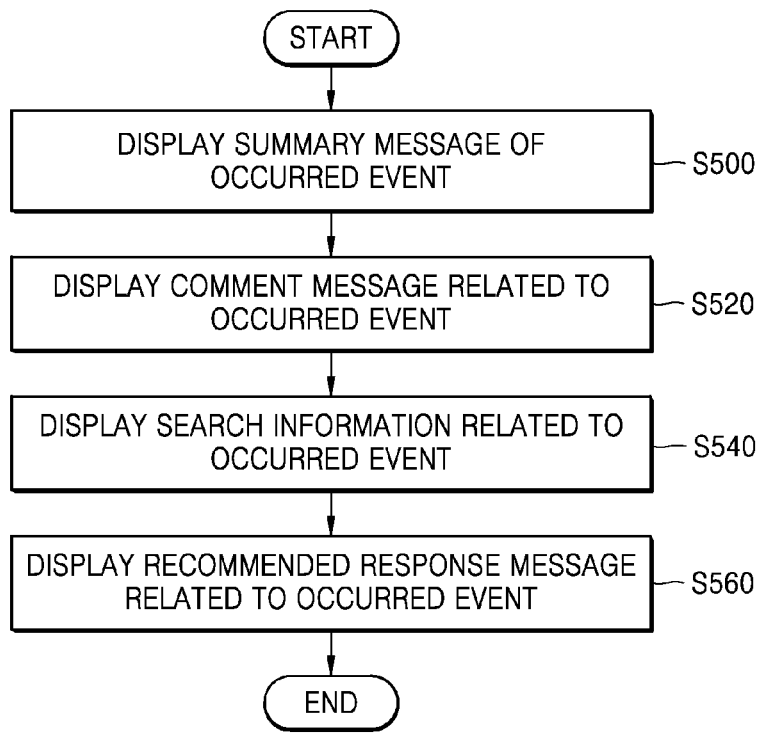
FIG. 5 is a flowchart of a method of displaying guidance information about an occurred event in the secondary chat window when the preset event has occurred, according to some exemplary embodiments.

FIG. 5 is a flowchart of a method of displaying guidance information about an occurred event in the secondary chat window 3000 when the preset event has occurred, according to some exemplary embodiments.

In operation S500, the device 1000 may display a summary message of an occurred event. The device 1000 may generate a summary message of an occurred event and display the generated summary message in the secondary chat window 3000. The device 1000 may generate a summary message of an occurred event by analyzing the meaning of at least one message associated with the occurrence of the event. For example, the device 1000 may generate a summary message including an identification value of a user of another device, which has transmitted a message that caused the occurrence of an event and a phrase describing the occurred event. For example, the phrase describing the occurred event may be the same as the message which has caused the occurrence of the event but is not limited thereto. For example, the device 1000 may generate the phrase describing the occurred event by editing the message which has caused the occurrence of the event. The phrase describing the occurred event may include brief content including only basic information included in the message. The basic information may be, for example, a keyword indicating the time and/or place in the message which has caused the occurrence of the event but is not limited thereto.

In addition, the device 1000 may generate the phrase describing the occurred event with reference to a manner of speaking (i.e., speech pattern) of the user of the other device that transmitted the message which has caused the occurrence of the event. The manner of speaking or the speech pattern of the user may refer to a dialect, an accent, a linguistic idiosyncrasy, a characteristic, and/or vocabulary, commonly associated with the user. In this case, the way of speaking of the user of the other device may be determined by analyzing messages transmitted in the past by the user of the other device. In addition, the way of speaking of the user of the other device may be stored in a memory in the device 1000 and matched with the identity of the user of the other device.

In operation S520, the device 1000 may display a comment message related to the occurred event. The comment message may be a message indicating a comment related to an event related to a message in a primary chat window. For example, the comment message may include information indicating matters to which the user refers to input a response message related to the occurred event. For example, the device 1000 may display, in the secondary chat window 3000, a comment message including information indicating that the occurred event overlaps with another scheduled event of the user. In this case, for example, the device 1000 may extract a user schedule registered in the device 1000 or a predetermined web service and determine whether the occurred event conflicts with the user's schedule. In addition, the device 1000 may generate a comment message indicating that the occurred event overlaps with a pre-registered schedule of the user. In addition, the comment message may include content inducing a response of the user. For example, the device 1000 may generate a comment message for informing that the prescheduled event of the user is an important event or a comment message for informing that the user's schedule requires an adjustment, but the disclosure is not limited thereto.

In addition, the device 1000 may cause messages related to a predetermined event to be blocked. When a message causing the occurrence of an event set to be blocked is received, the device 1000 may display, in the secondary chat window 3000, a comment message indicating that the message related to the occurred event has been blocked. In addition, the comment message indicating that the message has been blocked may include an identification value of another user who has transmitted the message causing the occurrence of the event set to be blocked. Alternatively, when a message causing the occurrence of an event set to be blocked is received, the device 1000 may ignore the received message and may not display information regarding the received message in the secondary chat window 3000.

In operation S540, the device 1000 may display search information about the occurred event. The device 1000 may search for information related to the occurred event and display retrieved search information in the secondary chat window 3000. For example, the device 1000 may display the retrieved search information in the secondary chat window 3000 or display link information for accessing the retrieved search information in the secondary chat window 3000. In addition, the device 1000 may edit the retrieved search information and display the edited information in the secondary chat window 3000.

In operation S560, the device 1000 may display a recommended response message related to the occurred event. The recommended response message may be a message including a response recommended to the user as a response of the user, which is related to the occurred event. In addition, for example, the device 1000 may analyze the occurred event and determine a recommended response related to the occurred event in consideration of a schedule of the user, a status of the device 1000, a status of the user, and the like. Information indicating the status of the device 1000 and the status of the user may be acquired from, for example, a sensor included in the device 1000 or communicating with the device 1000, a server, and/or another device. The device 1000 may display the recommended response message related to the occurred event in the secondary chat window 3000.

FIGS. 6A and 6B illustrate the device 1000 providing a comment message based on a user schedule, according to some exemplary embodiments.

Referring to FIG. 6A, the user of the device 1000 may send and receive messages in a primary chat window 2060 with at least one other user. When the user of the device 1000 sends a message 600 to other users in the chat window 2060, the device 1000 may determine a category of messages in the chat window 2060 by analyzing the messages. In addition, when a message 610 including a specific keyword corresponding to the determined category is received, the device 1000 may determine whether a specific event related to the determined category has occurred by analyzing the meaning of the message 610. For example, the device 1000 may assign a category, "appointment", by analyzing the messages in the chat window 2060. In addition, the device 1000 may identify the words "evening" and "8 o'clock" included in the message 610 and determine that a message proposing a meet-up has been received, by analyzing the meaning of the message 610.

As shown in FIG. 6B, when the device 1000 determines that the preset event related to the determined category has occurred, as a result of analyzing the meaning of the message 610, the device 1000 may generate a secondary chat window 3060. A message 620, which is identical to the message 610 from another user in the primary chat window 2060, may be displayed in the newly generated secondary chat window 3060. The device 1000 may generate a comment message 630 related to the occurred event by using schedule information about the user and display the generated comment message 630 in the secondary chat window 3060. For example, the device 1000 may determine whether a schedule in the message 610 received in the chat window 2060 overlaps with a schedule included in the schedule information about the user, by using the schedule information about the user. In addition, the device 1000 may generate the comment message 630 for informing that the schedule requested in the message 610 overlaps with the schedule of the user and display the generated comment message 630 in the secondary chat window 3060. The comment message 630 may include a phrase informing about the conflict of schedule of the user and a phrase inducing a response from the user. For example, the comment message 630 may include the phrase, "You have a dinner appointment this evening. Do you want to send a decline response to John?" in the secondary chat window 3060.

In addition, the device 1000 may receive a user input for inputting a response message 640 in response to the comment message 630 in the secondary chat window 3060. In addition, the device 1000 may input, into the chat window 2060, the response message 640 input in the secondary chat window 3060 so that other users view the response message 640 of the user through the chat window 2060.

Figure 7:
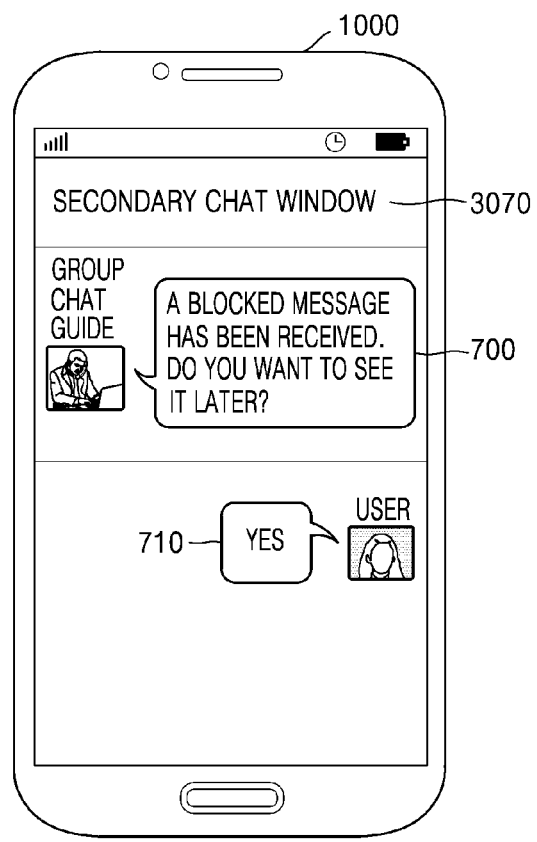
FIG. 7 illustrates the device displaying, in a secondary chat window 3070, a comment message for informing that a blocked message has been received, according to some exemplary embodiments.

FIG. 7 illustrates the device 1000 displaying, in a secondary chat window 3070, a comment message 700 for informing that a blocked message has been received, according to some exemplary embodiments.

Referring to FIG. 7, when a message from another user set by the user to be blocked is received through a primary chat window, the device 1000 may generate the secondary chat window 3070 and display, in the secondary chat window 3070, the comment message 700 for informing that a blocked message has been received. The comment message 700 may include content for informing that blocked content has been received and an identification value of the other user who has transmitted the blocked message. For example, when the user of the device 1000 has set messages from "John" to be blocked, the device 1000 may display the comment message 700, "A message from John, which you have set to be blocked, has been received. Do you want to see it later?" in the secondary chat window 3070. In addition, the device 1000 may receive a response message 710 from the user, which indicates blocking of the message. For example, the device 1000 may receive the response message 710, "Later".

According to an aspect of an exemplary embodiment, when receiving the response message 710 indicating blocking of a message is received, the device 1000 may block the received message. The device 1000 may store the blocked message. For example, the blocked message may be stored in a separate message folder such as "blocked message folder". When the blocked message is stored, the device may display, in the secondary chat window 3070, a message such as "The blocked message has been stored".

According to another exemplary embodiment, the user may input, in a secondary chat window, a message to be transmitted to another user. For example, the user may input, in the secondary chat window, a message such as, "Tell John 'you are selfish.'" The device 1000 may analyze a message input by the user. For example, the device 1000 may determine that information which may cause displeasure of another user is included in message content input by the user, by using a semantic analysis method, but the present exemplary embodiment is not limited thereto. When a message including information which may upset the recipient is input by the user, the device 1000 may display, in the secondary chat window, a message proposing to the user to not transmit the message. According to an exemplary embodiment, when the user inputs, in response to the comment message, a response message for canceling the transmission of the message, the device 1000 may cancel the transmission of the message input by the user. The device 1000 may store, in a separate message folder, the canceled message. When the canceled message is stored, the device 1000 may display, in the secondary chat window, a message such as "the canceled message has been stored".

Figure 8A:
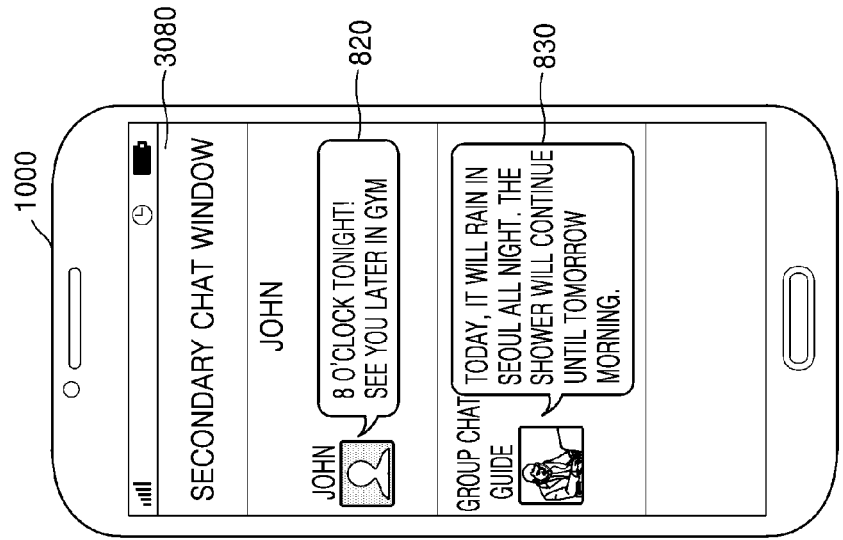
FIGS. 8A and 8B illustrate the device displaying, in a secondary chat window 3080, search information about an occurred event, according to some exemplary embodiments.
Figure 8B:
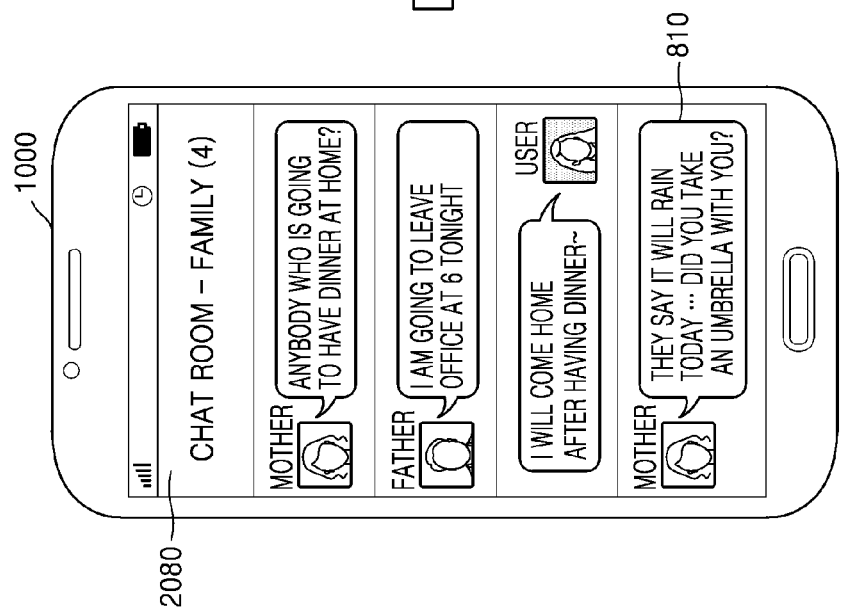

FIGS. 8A and 8B illustrate the device 1000 displaying, in a secondary chat window 3080, search information about an occurred event, according to some exemplary embodiments.

As shown in FIG. 8A, the device 1000 may receive, through a primary chat window 2080, a message 810 that includes a specific keyword from another user. The device 1000 may analyze the meaning of the message 810 including the keyword and determine whether an event of searching for information related to the keyword has occurred. As a result of analyzing the meaning of the message 810, when a search for search information related to the occurred event is necessary, the device 1000 may search for the search information related to the occurred event by using the keyword in the message 810. For example, the device 1000 may determine that today's weather forecast is needed based on a message, "They say it will rain today . . . . Did you take an umbrella with you?" including the keyword "rain."

As shown in FIG. 8B, the device 1000 may display retrieved search information in a secondary chat window 3080. The device 1000 may display, in the secondary chat window 3080, a message 830 including the retrieved search information together with a summary message 820 related to messages which the user has not confirmed from among messages in the chat window 2080. The device 1000 may generate the message 830 by editing the retrieved search information and display the generated message 830 in the secondary chat window 3080.

Figure 9:
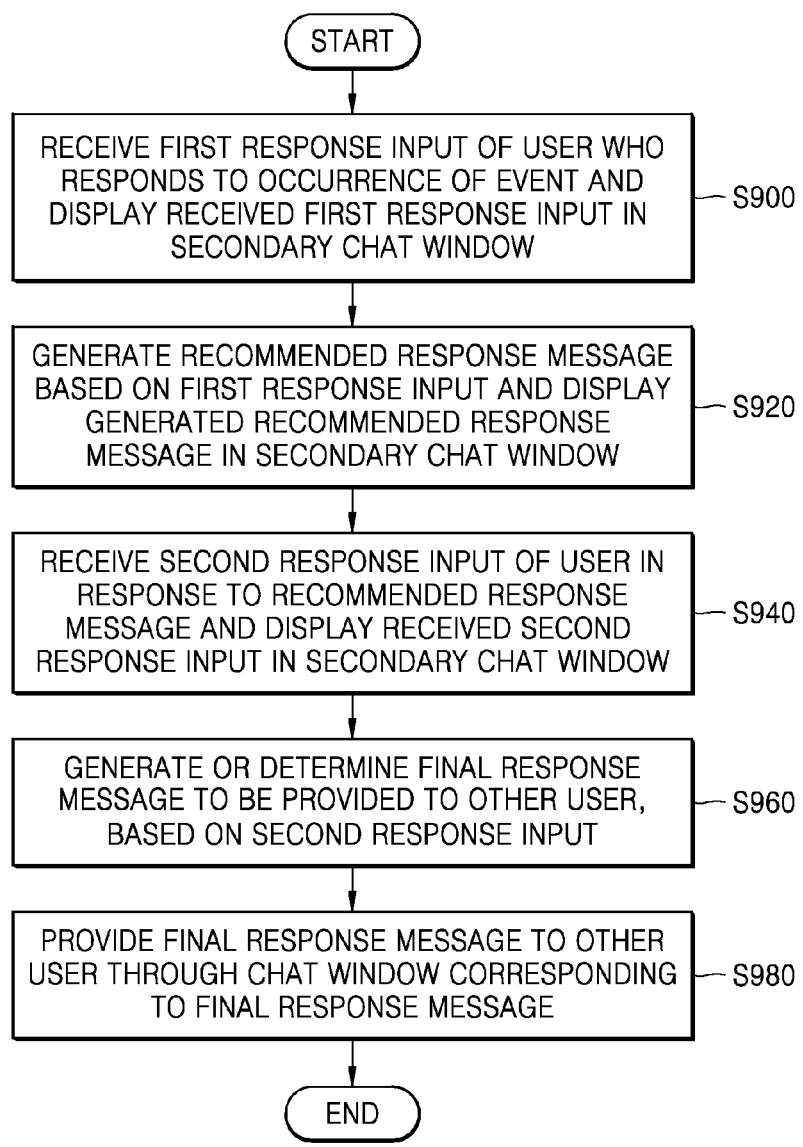
FIG. 9 is a flowchart of a method of providing, to another user through a chat window, a response message input from a user through the secondary chat window 3000, according to some exemplary embodiments.

FIG. 9 is a flowchart of a method of providing, to another user through a chat window, a response message input from a user through the secondary chat window 3000, according to some exemplary embodiments.

In operation S900, the device 1000 may receive a first response input of the user who responds to the occurrence of an event and display the received first response input in the secondary chat window 3000. The device 1000 may display a message related to the occurred event in the secondary chat window 3000 and receive the first response input of the user who inputs a response to the displayed message. The first response input of the user may be a simple response including at least one word. For example, the first response input of the user may not be a complete sentence and may include only a few keywords related to content which the user desires to respond to. The first response input of the user may be a text input and/or a speech input but is not limited thereto.

Alternatively, when a plurality of events occur, and a plurality of messages related to the plurality of events are displayed in the secondary chat window 3000, the user may input first response inputs respectively corresponding to the plurality of events.

In operation S920, the device 1000 may generate a recommended response message based on the first response input and display the generated recommended response message in the secondary chat window 3000. The device 1000 may generate the recommended response message based on content of the occurred event and words included in the first response input. For example, the device 1000 may generate a response related to the occurred event in a form of a complete sentence by using the words included in the first response input.

Alternatively, when a plurality of events occur, and a plurality of first response inputs respectively corresponding to the plurality of events are input, the device 1000 may generate a plurality of recommended response messages respectively corresponding to the plurality of events. Alternatively, when the user inputs first responses to some of the plurality of events, the device 1000 may generate recommended response messages related to the events respectively corresponding to the input first response inputs, based on the input first response inputs. Alternatively, when the user inputs responses to some of the plurality of events, the device 1000 may generate recommended response messages related to events for which first response inputs of the user have not been input, in consideration of the input first response inputs of the user.

In addition, the device 1000 may generate the recommended response message in consideration of a phrase frequently used by the user and a relationship between the user and the other user but is not limited thereto. For example, the device 1000 may store and manage information regarding a history of messages transmitted and received by the user to and from the other user through a chat application and content shared by the user with the other user, and determine the phrase frequently used by the user and the relationship between the user and the other user based on the stored information.

In operation S940, the device 1000 may receive a second response input of the user in response to the recommended response message and display the received second response input in the secondary chat window 3000. The user may input the second response input related to whether to agree to transmit the recommended response message recommended by the device 1000 to the other user. Alternatively, the user may input the second response input for editing the recommended response message recommended by the device 1000. Alternatively, the user may input the second response input for designating recipient of the recommended response message so that it is determined to whom the recommended response message recommended by the device 1000 is transmitted. Alternatively, the device 1000 may receive the second response input indicating which portion of the recommended response message is to be transmitted to another user. Alternatively, the device 1000 may receive the second response input for requesting the device to provide another recommended response message. In this case, the device 1000 may generate another recommended response message and display the generated other recommended response message in the secondary chat window 3000. The second response input of the user may be a text input and/or a speech input but is not limited thereto.

In operation S960, the device 1000 may generate or determine a final response message to be provided to the other user, based on the second response input, and display the generated or determined final response message in the secondary chat window 3000.

In operation S980, the device 1000 may provide the final response message to the other user through a chat window corresponding to the final response message.

For example, when a plurality of events occur in a plurality of chat windows, respectively, and when a plurality of final response messages respectively corresponding to the plurality of events are determined, the device 1000 may input the plurality of final response messages in the plurality of chat windows corresponding to the plurality of final response messages, respectively.

In addition, for example, when the user communicates with a plurality of other users in a chat window, and the user inputs the second response input such that the second response input is transmitted to some of the plurality of other users, the device 1000 may provide the final response message to only some of the plurality of other users. In this case, the device 1000 may input and display the final response message in the chat window and display, together with the final response message, an identification value indicating to whom of the other users in the chat window the input final response message is provided.

FIGS. 10A-10B, 11, and 12A-12B illustrate the device 1000 providing, through the secondary chat window 3000, a recommended response message to the user and providing a final response message to another user through a chat window.

Figure 10A:
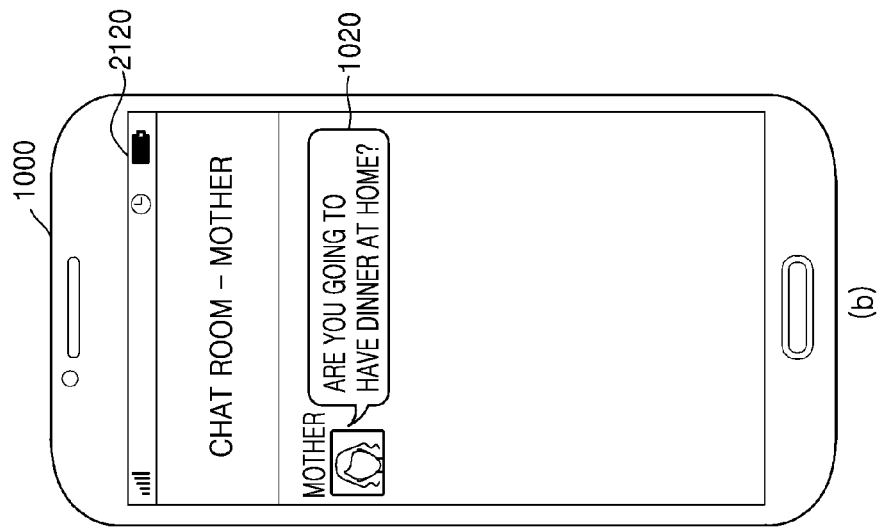
FIGS. 10A and 10B illustrate the device receiving messages from other users through a plurality of chat windows, according to some exemplary embodiments.
Figure 10B:
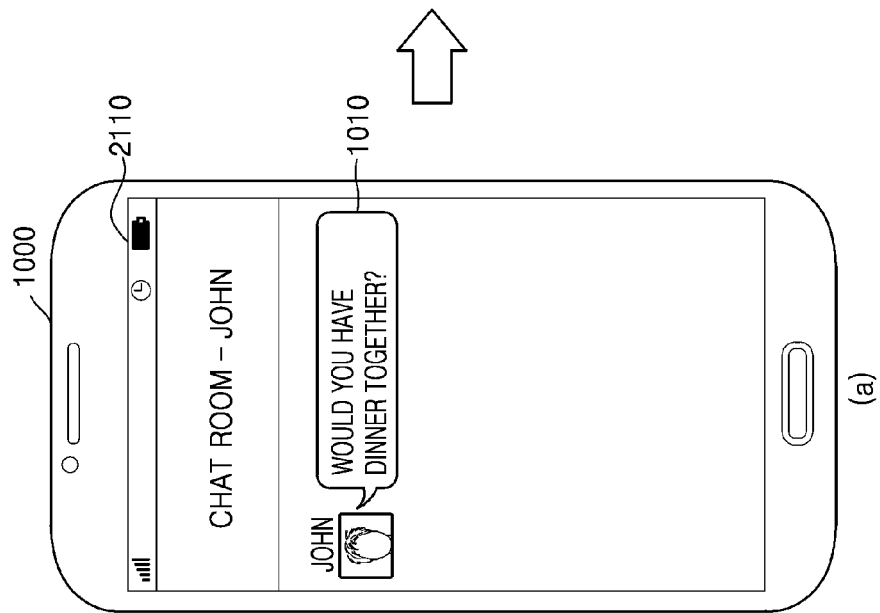

FIGS. 10A and 10B illustrate the device 1000 receiving messages from other users through a plurality of chat windows 2110 and 2120, according to some exemplary embodiments. As shown in FIGS. 10A and 10B, the device 1000 may receive an exemplary message 1010, "Would you have dinner together?" from a user named John through the chat window 2110. In addition, the device 1000 may receive a message 1020, "Are you going to have dinner at home?" from Mother through the chat window 2120. The messages 1010 and 1020 may trigger events belonging to the same category.

Figure 11:
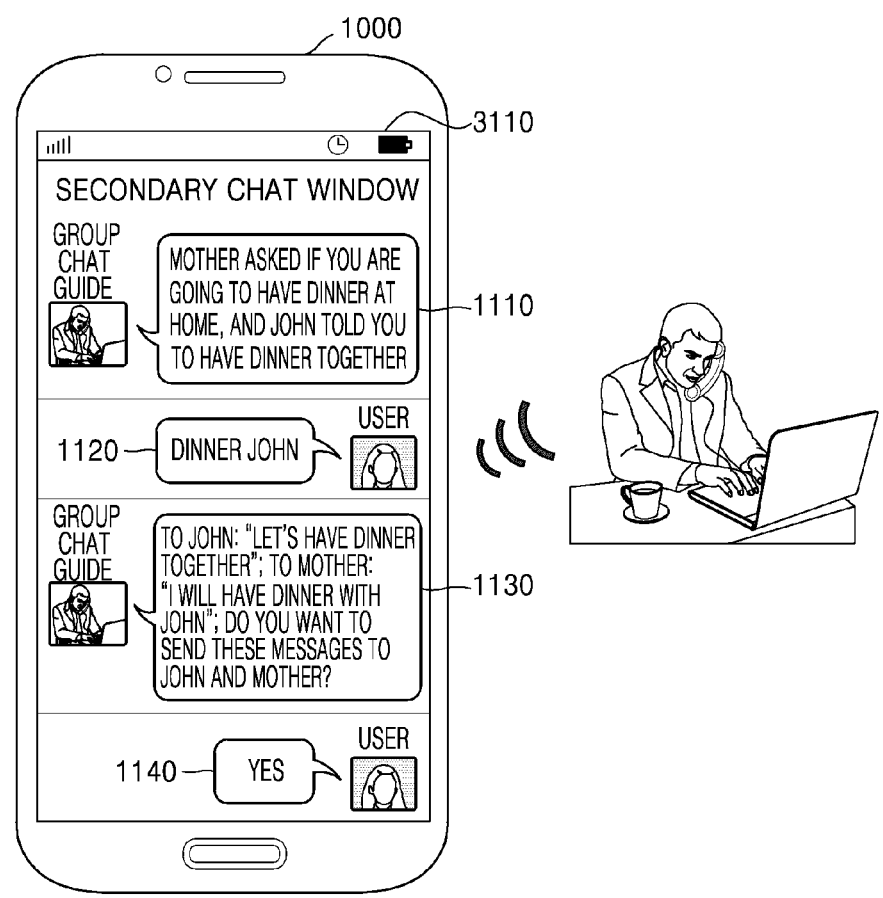
FIG. 11 illustrates the device providing, to the user through a secondary chat window, a recommended response message related to the events occurred in FIG. 10, according to some exemplary embodiments.

FIG. 11 illustrates the device 1000 providing, to the user through a secondary chat window 3110, a recommended response message related to the events occurred in FIG. 10, according to some exemplary embodiments.

As shown in FIG. 11, the device 1000 may display, in the secondary chat window 3110, a message 1110 obtained by summarizing the messages 1010 and 1020 received in FIGS. 10A and 10B. The message 1110 may include phrases indicating the occurred events and may be represented by one or more sentences generated or modified by the device 1000. For example, the message 1110 may include a sentence, "Mother asked if you are planning to have dinner at home, and John asked to have dinner together." However, the message 1110 is not limited thereto and may include guidance information for informing that events belonging to the same category conflict with each other via the plurality of chat windows 2110 and 2120.

In addition, the device 1000 may receive a first response input 1120 for responding only to John between John and mother. For example, the device 1000 may receive the first response input 1120 from the user, "Dinner John", in response to the message 1110, indicating that the user wishes to have dinner with John.

In addition, the device 1000 may generate a recommended response message 1130 based on the first response input 1120 and display the generated recommended response message 1130 in the secondary chat window 3110. For example, the device 1000 may generate a response, "Let's have dinner together", to be provided to John based on the first response input 1120, and generate a response, "I will have dinner with John," to be provided to Mother, who has caused the occurrence of the event for which no response has been input, in consideration of the first response input 1120. In addition, the device 1000 may display the recommended response message 1130, "To John: Let's have dinner together; To mother: I will have dinner with John; Do you want to send these messages to John and mother?", in the secondary chat window 3110. However, the present exemplary embodiment is not limited thereto, and a recommended response message may be generated and displayed in various forms.

In addition, the device 1000 may receive a second response input 1140 of the user in response to the recommended response message 1130 and display the received second response input 1140 in the secondary chat window 3110. The device 1000 may receive, from the user, the second response input 1140 indicating that the user agrees to provide the recommended response message 1130 to the other users. In addition, the device 1000 may determine a final response message according to the second response input 1140 of the user.

FIGS. 12A and 12B illustrate displaying, in chat windows 2110 and 2120, final response messages determined according to the recommended response message 1130 of FIG. 11, according to some exemplary embodiments.

As shown in FIGS. 12A and 12B, the device 1000 may display a final response message 1211, "Let's have dinner together," in the chat window 2110 and display a final response message 1221, "I will have dinner with John," in the chat window 2120.

According to another exemplary embodiment, the user may input, through a secondary chat window, a message to be transmitted to a plurality of other users. For example, the user may input a message, "Tell group A and group B 'I am going to travel this weekend,'" in the secondary chat window. The device 1000 may modify the message input in the secondary chat window by the user or generate a new message, based on relationship information between the user and each of the plurality of other users. For example, the device 1000 may generate recommended response messages in consideration of relationships between the user and the groups A and B, such as "Do you want to send a message, 'I am going to travel this weekend. Please email only if it is an emergency,' to group A?" and "Do you want to send a message, "I am going to travel this weekend. I will not to be able to join the weekend meeting," to group B?", and display the generated recommended response messages in the secondary chat window. The user may input a response message for approving a portion or all of the recommended response messages, and the device 1000 may transmit messages to the plurality of other users based on the response message of the user.

Figure 13:
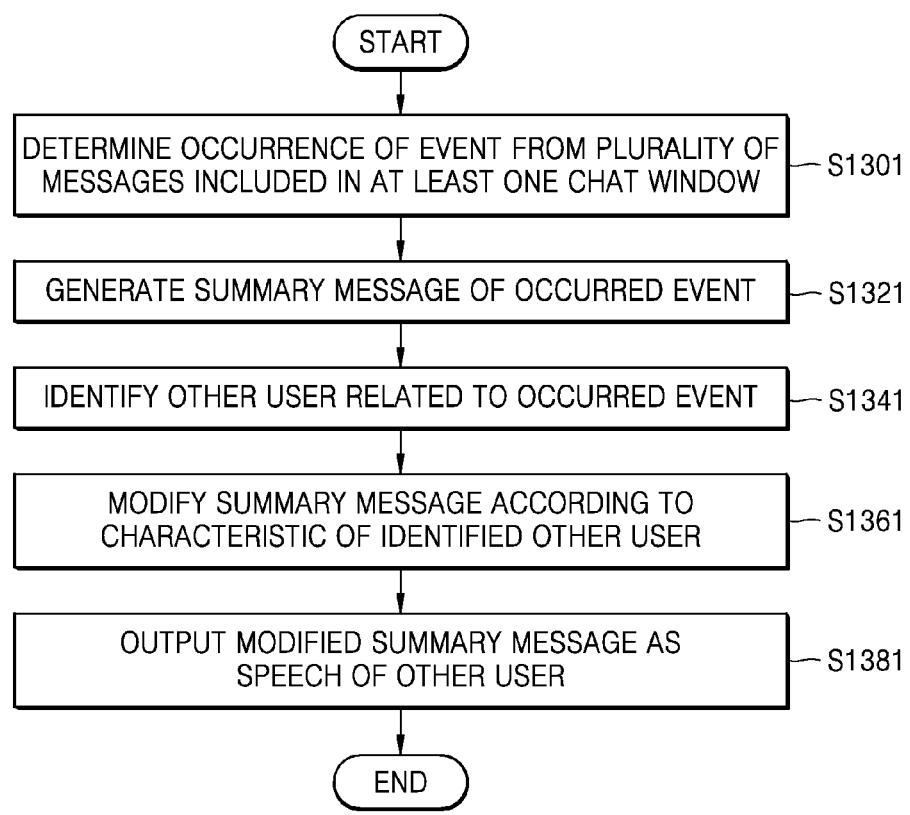
FIG. 13 is a flowchart of a method of outputting, as a speech, a summary message of an occurred event, according to some exemplary embodiments.

FIG. 13 is a flowchart of a method of outputting, as a speech, a summary message of an occurred event, according to some exemplary embodiments.

In operation S1301, the device 1000 may determine whether an event has occurred from a plurality of messages included in at least one chat window.

In operation S1321, the device 1000 may generate a summary message of the occurred event.

In operation S1341, the device 1000 may identify another user related to the occurred event.

In operation S1361, the device 1000 may modify the summary message according to a characteristic of the identified other user. For example, the device 1000 may modify the summary message based on information regarding a phrase frequently used by the identified user and/or relationship information between the user and the other user, but the disclosure is not limited thereto. For example, the device 1000 may adjust a tone of the generated summary message according to a speech pattern of the other user. In addition, the device 1000 may cumulatively collect information to be used as a basis for modifying the summary message, from messages of other users in a chat window, but is not limited thereto.

In operation S1381, the device 1000 may output the modified summary message as a speech of the other user. In this case, speech information about the speech of the other user may be stored in advance, and the device 1000 may output the summary message as a synthesized speech of the other user by using the stored speech information.

Figure 14:
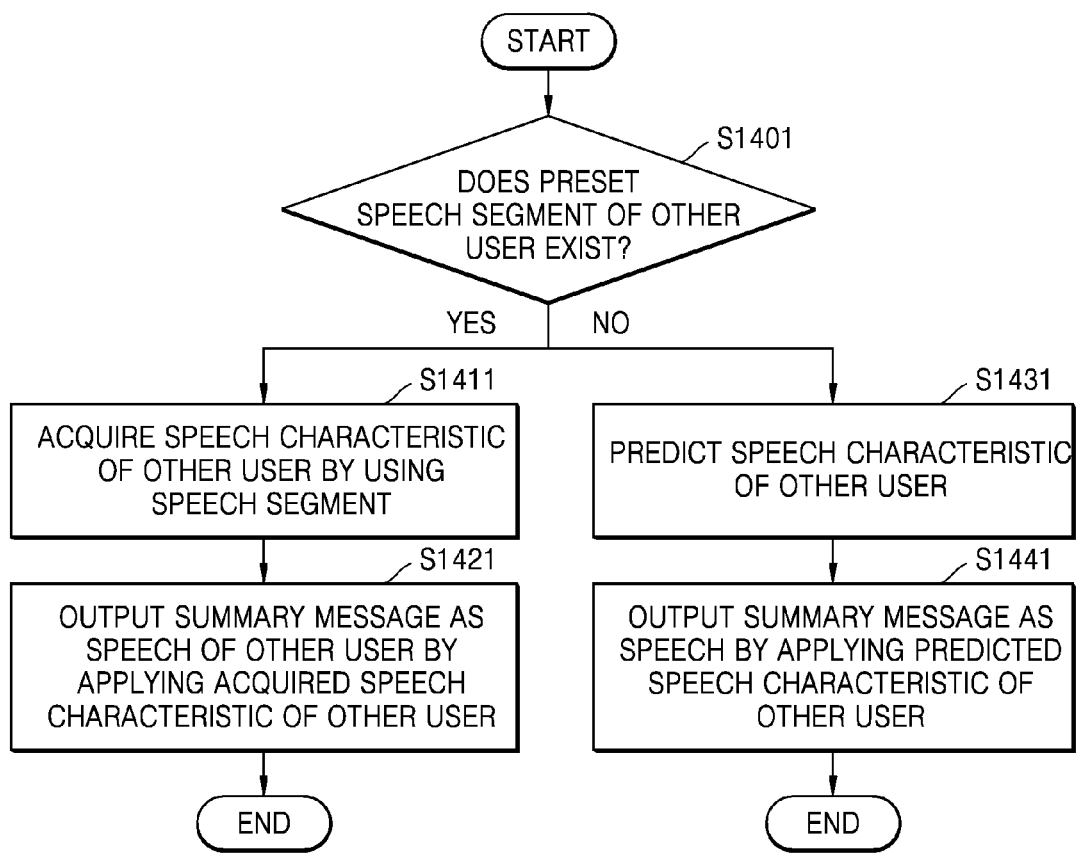
FIG. 14 is a flowchart of a method of outputting, as a speech, a summary message of an occurred event according to the existence of a speech segment, according to some exemplary embodiments.

FIG. 14 is a flowchart of a method of outputting, as a speech, a summary message of an occurred event according to the existence of a speech segment, according to some exemplary embodiments.

In operation S1401, the device 1000 may determine whether a speech segment of another user exists in a storage. The device 1000 may cumulatively store, for example, a call history of the other user and speech data received from the other user, and the device 1000 may determine whether a speech segment of the other user exists.

If it is determined as a result of the determination in operation S1401 that a speech segment of the other user exists, the device 1000 may acquire a speech characteristic of the other user by using the speech segment of the other user in operation S1411. For example, the device 1000 may collect speech segments of the other user, then acquire a text corresponding to the collected speech segments by using a speech recognition method, and generate a speech learning model of the other user by using the acquired text. In addition, the device 1000 may acquire a speech characteristic of the other user by using the generated speech learning model of the other user.

In operation S1421, the device 1000 may output, as a speech of the other user, a summary message of a message received from the other user by applying the speech characteristic of the other user.

If it is determined as a result of the determination in operation S1401 that no speech segment of the other user exists, the device 1000 may predict the speech characteristic of the other user in operation S1431. For example, the device 1000 may predict the speech characteristic of the other user by using attribute information about the other user and messages received from the other user but is not limited thereto. The attribute information about the other user may include a gender and an age of the other user but is not limited thereto. The speech characteristic of the other user thus predicted may be an approximation of the speech of the other user based on the attribute information and the messages.

In operation S1441, the device 1000 may output, as a speech, the summary message by applying the predicted speech characteristic of the other user. The speech may be a synthesized speech utterance.

According to another exemplary embodiment, a speech characteristic for a summary message to be output as a speech may be determined based on state information about the device 1000. The state information about the device 1000 may include time and place information, motion information about the device 1000, and the like. The device 1000 may acquire the state information about the device 1000 through a microphone, a photosensor, a speed sensor, and the like. For example, when the user uses the device 1000 during work at an office in the afternoon, the device 1000 may output summary information briefly and quickly by applying a speech characteristic of a broadcast announcer so as not to disturb the work, based on acquired state information about the device 1000. However, the present exemplary embodiment is not limited thereto.

Figure 15:
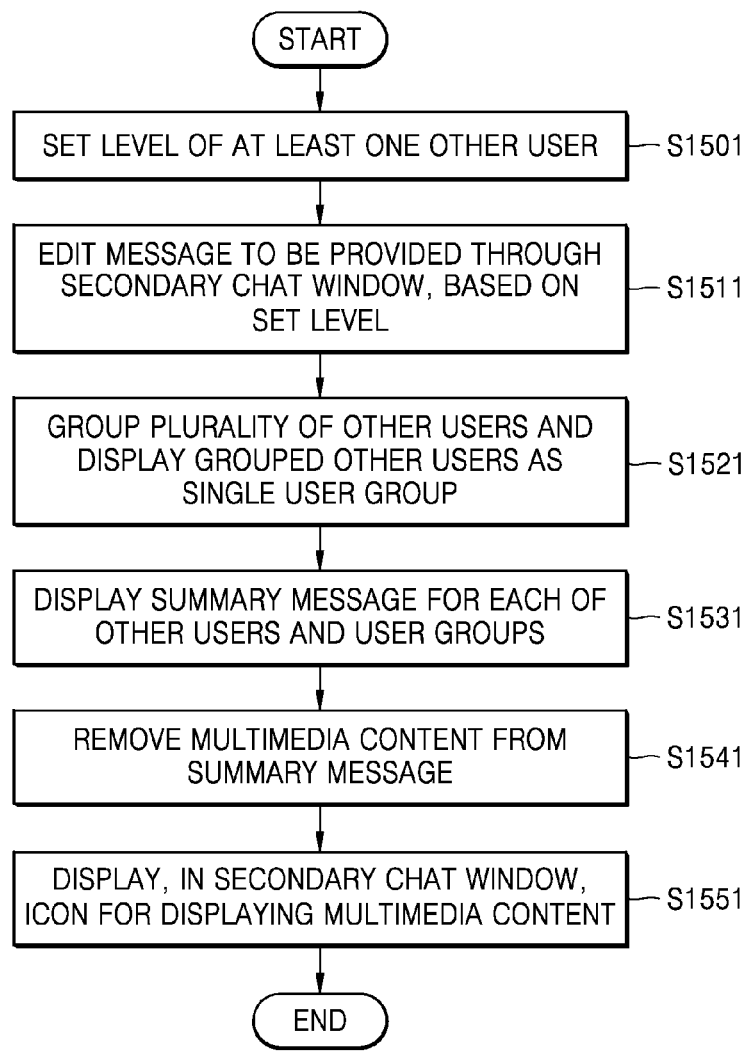
FIG. 15 illustrates the device providing a message through the secondary chat window 3000, according to some exemplary embodiments.

FIG. 15 illustrates the device 1000 providing a message through the secondary chat window 3000, according to some exemplary embodiments.

In operation S1501, the device 1000 may set a level of at least one other user. The device 1000 may receive a user input for setting levels of other users before and after receiving messages from the other users through a chat window. When the user does not set levels of the other users, the levels of the other users may be set to a default value. In addition, the device 1000 may display identification values indicating the levels of the other users in the chat window and the secondary chat window 3000. The level may indicate priority assigned to each of the users.

In operation S1511, the device 1000 may edit a message to be provided to the other user through the secondary chat window 3000, based on the set level. For example, the user may set the level of the other user as an important level (i.e., high priority), and the device 1000 may display, in the secondary chat window 3000, only a summary message related to a message received from the other user set to the important level. In addition, the device 1000 may provide a message input by the user through the secondary chat window 3000 only to the other user set to the important level.

For example, the user may set the level of the other user as a blocking level (i.e., low priority), and the device 1000 may not generate a summary message of a message received from the other user set to the blocking level. In addition, when a summary message of a message received from the other user set to the blocking level is already displayed in the secondary chat window 3000, the displayed summary message may be removed or hidden.

In operation S1521, the device 1000 may group a plurality of other users and display messages received from the grouped other users as a single user group. The device 1000 may display, in the secondary chat window 3000, the messages received from the grouped other users together with an identification value indicating the user group. The device 1000 may generate a plurality of user groups based on at least one criterion. Other users may belong to the plurality of user groups.

An identification value of a user group may include an image and/or a text. In addition, the identification value of the user group may be an identification value randomly generated by the device 1000, an identification value generated based on identification values of a plurality of other users belonging to the user group, or an identification value input by the user but is not limited thereto. The identification value may be unique to the user group that the value is assigned to In operation S1531, the device 1000 may display a summary message for each of the other users or user groups. The device 1000 may individually display a summary message of another user and a summary message of a user group in the secondary chat window 3000. The device 1000 may display both the summary message of the other user and the summary message of the user group in one secondary chat window. However, the present exemplary embodiment is not limited thereto, and the device 1000 may display the summary message of the other user and the summary message of the user group in different secondary chat windows, respectively.

In operation S1541, the device 1000 may remove multimedia content included in a message in a chat window from the summary message. The device 1000 may not insert the multimedia content included in the message in the chat window into the summary message. The multimedia content may include speech content, image content, and video content but is not limited thereto. In addition, the device 1000 may be configured to not display the multimedia content included in the chat window in the secondary chat window 3000. The device 1000 may be configured to not display multimedia content, according to various criteria based on a user input.

In operation S1551, the device 1000 may display, in a secondary chat window, an icon for displaying the multimedia content which has not been displayed. In other words, the icon may be a placeholder for some multimedia content that is currently hidden from the view. When the device 1000 receives a user input for selecting the icon, the device 1000 may display the multimedia content corresponding to the icon in the secondary chat window 3000. Alternatively, the device 1000 may display the multimedia content corresponding to the icon in a separate window.

Figure 16:
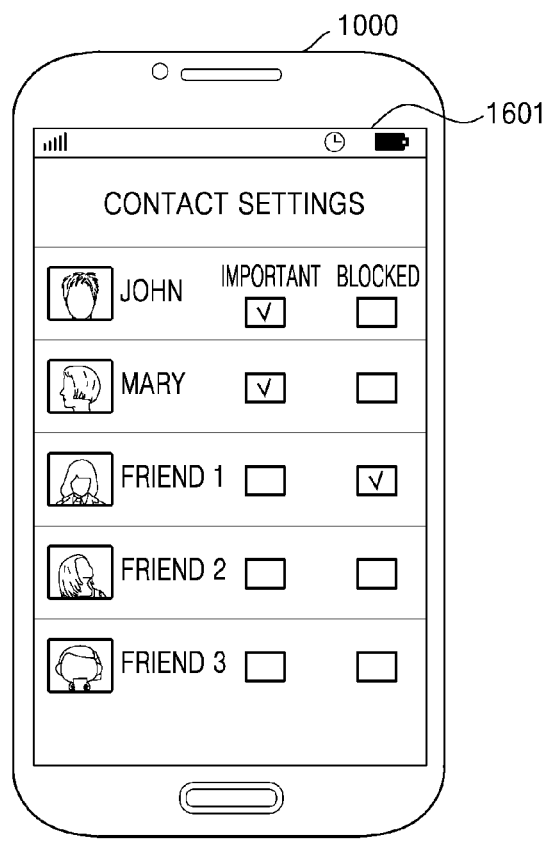
FIG. 16 illustrates a graphic user interface (GUI) for setting levels of other users, according to some exemplary embodiments.

FIG. 16 illustrates a GUI 1601 for setting levels of other users, according to some exemplary embodiments.

Referring to FIG. 16, the GUI 1601 for setting levels of other users may include a list of the other users and graphical objects for selecting the levels of the other users. For example, the device 1000 may receive a user input for assigning the important level to, for example, users John and Mary. In addition, the device 1000 may receive a user input for assigning the blocking level to, for example, a user designated as "Friend 1."

Figures 17A, 17B:
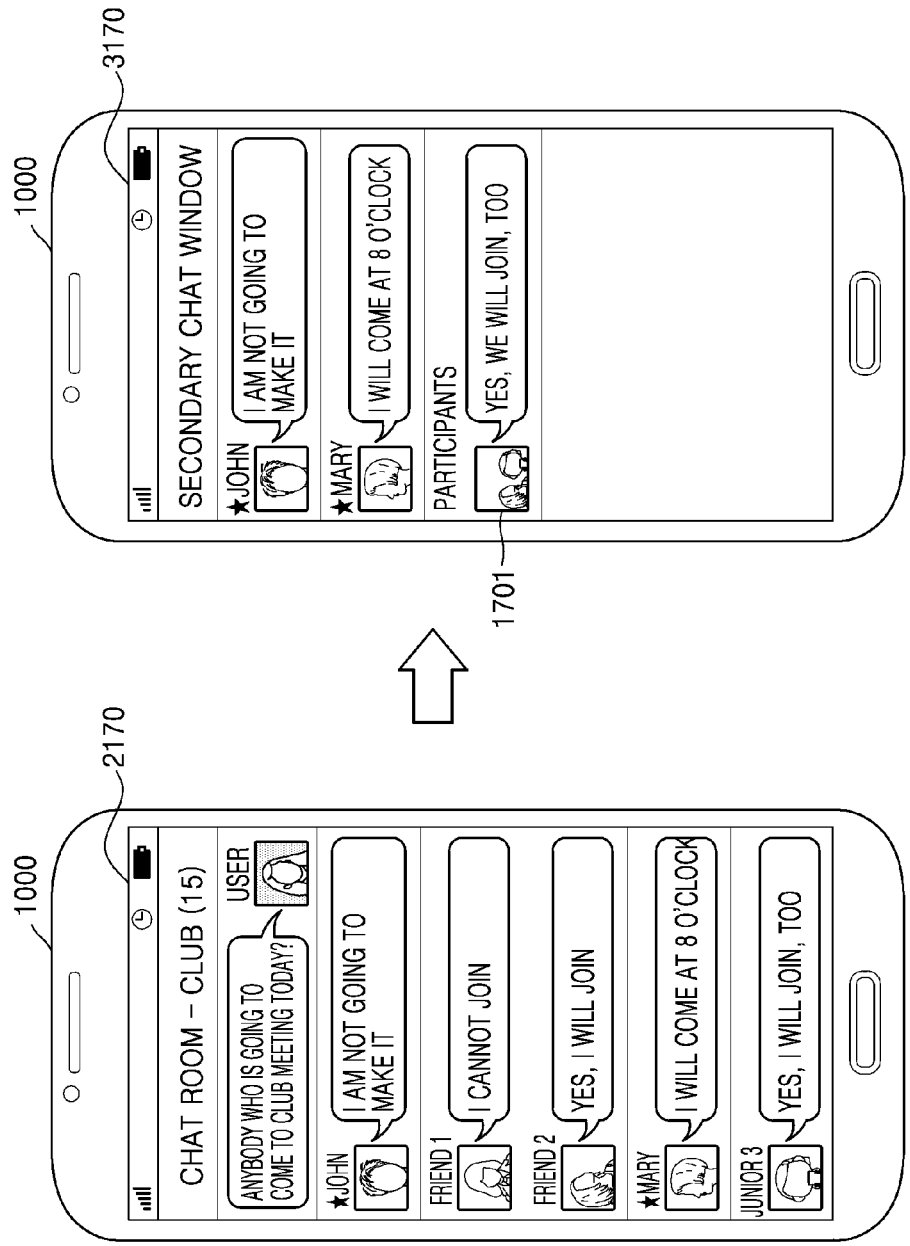
FIGS. 17A and 17B illustrate the device displaying summary messages of other users and a summary message of a user group in a secondary chat window, according to some exemplary embodiments.

FIGS. 17A and 17B illustrate the device 1000 displaying summary messages of other users and a summary message of a user group in a secondary chat window 3170, according to some exemplary embodiments.

Referring to FIG. 17A, messages received from a plurality of other users set to different levels in FIG. 16 may be displayed in a chat window 2170.

Referring to FIG. 17B, the device 1000 may display, in the secondary chat window 3170, summary messages of John and Mary, who are assigned the important level. The device 1000 may display, in the chat window 2170 and the secondary chat window 3170, star-shaped icons indicating the important level. The device 1000 may display, in the secondary chat window 3170, messages of John and Mary, who are assigned the important level, without modifying the messages.

In addition, the device 1000 may not display, in the secondary chat window 3170, a summary message for Friend 1, who is assigned the blocking level.

In addition, the device 1000 may group a plurality of other users, "Friend 2" and "Friend 3," who have not been assigned the important level or the blocking level and display the grouped other users as a single user group 1701. The device 1000 may display a text, "participants", and an icon including images of the participants in the primary chat window 2170 to identify the user group 1701. The device 1000 may briefly summarize contents of messages received from "Friend 2" and "Friend 3" belonging to the user group 1701 in the primary chat window 2170 and display a summary message, "Join", of changed content in the secondary chat window 3170.

FIGS. 18A through 18C illustrate the device 1000 displaying, in a secondary chat window 3180b, multimedia content included in a chat window 2180, according to some exemplary embodiments.

Referring to FIG. 18A, an image 1800 transmitted from the user John may be displayed in the primary chat window 2180.

Referring to FIG. 18B, the device 1000 may not display, in a secondary chat window 3180a, the image 1800 included in the chat window 2180 of FIG. 18A. In addition, the device 1000 may display, in the secondary chat window 3180a, an icon 1810 as a replacement or placeholder for displaying the image 1800.

Referring to FIG. 18C, when the user selects the icon 1810 in the secondary chat window 3180a, the device 1000 may generate a separate secondary chat window 3180b other than the secondary chat window 3180a and display the image 1800 in the generated secondary chat window 3180b.

FIGS. 19A-19B and 20A-20B illustrate the device 1000 displaying messages of other users by using a primary chat window and secondary chat windows 3190a and 3190b, according to some exemplary embodiments.

Figure 19A:
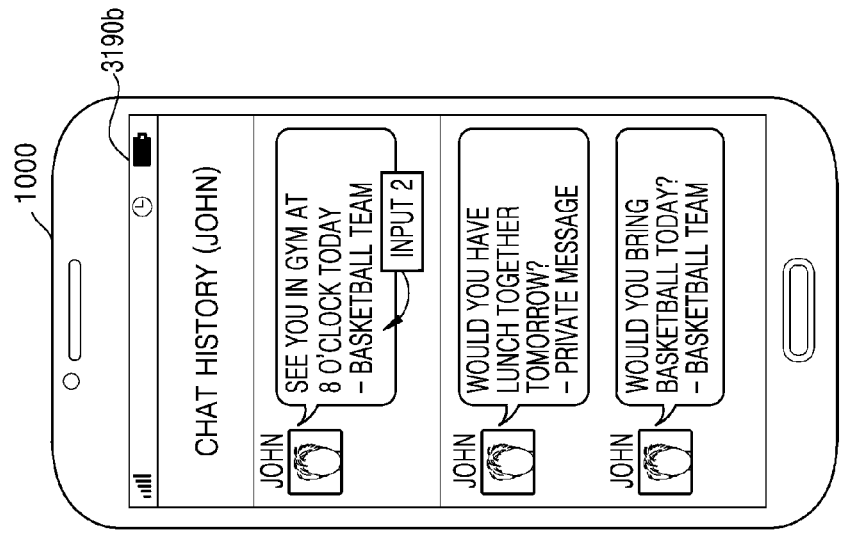
FIGS. 19A, 19B, 20A and 20B illustrate the device displaying messages of other users by using a chat window and secondary chat windows, according to some exemplary embodiments.

As shown in FIG. 19A, the device 1000 may display, in the secondary chat window 3190a, messages related to a subject, "sports," from among a plurality of messages in at least one primary chat window. For example, the device 1000 may display, in the secondary chat window 3190a, a message, "See you in the gym at 8 o'clock today," from John; a message, "Please, pay a basketball membership fee", received from Bob; and a message, "Let's play soccer, too", received from "Rick." In addition, the device 1000 may receive a user input 1 for selecting an identification value of the other user John, which is displayed in the secondary chat window 3190a.

Figure 19B:
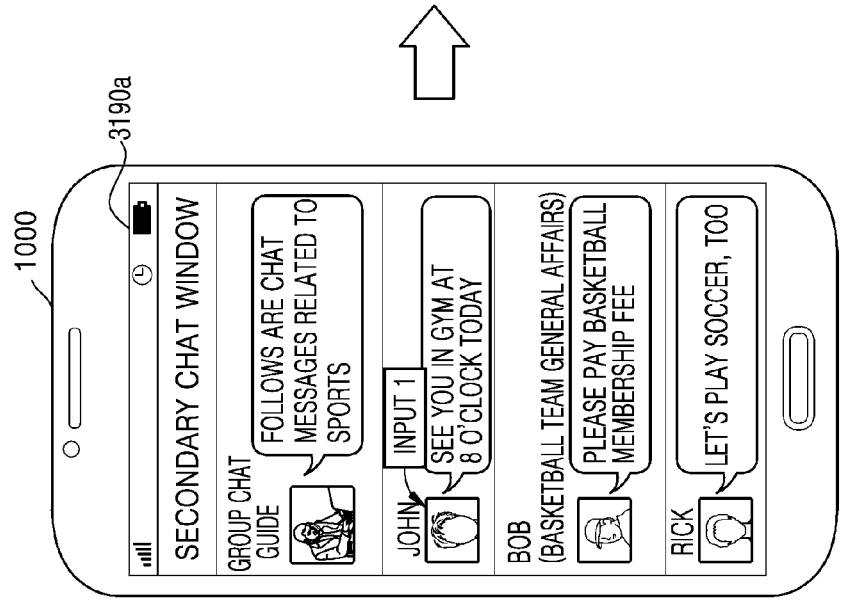

In FIG. 19B, the device 1000 may display the secondary chat window 3190b for displaying messages received from John on a screen in response to the user input 1, which corresponds to the user John. The device 1000 may display, in the secondary chat window 3190b, a plurality of messages received from John from among the plurality of messages in the at least one primary chat window. The messages displayed in the secondary chat window 3190b may be displayed with identification values (e.g., "basketball team" and "private message") of chat windows through which the messages have been received. For example, an identification value may be a tag, a label, a classifier, or a category. In addition, the device may receive a user input 2 for selecting "basketball team" displayed in the secondary chat window 3190b.

Figure 20A:
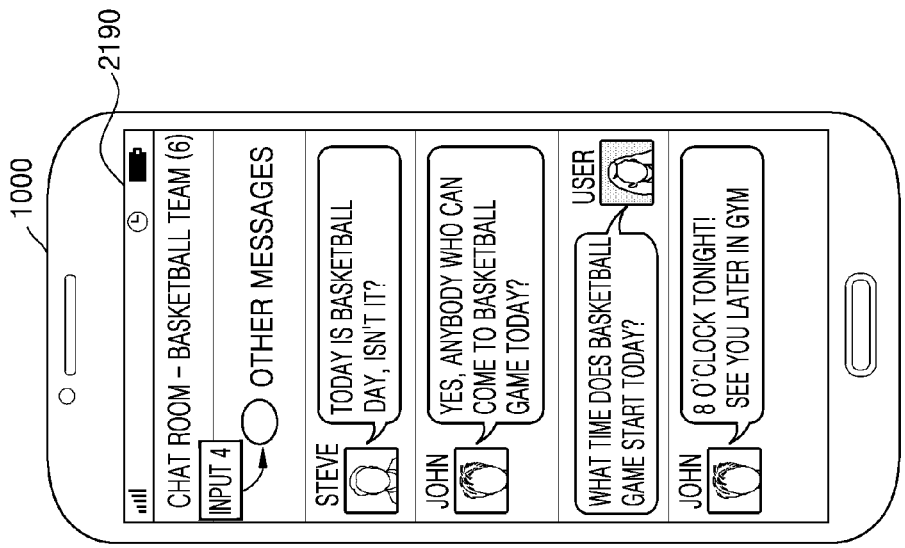

As shown in FIG. 20A, the device 1000 may display a "basketball team" chat window 2190 on the screen of the device 1000 in response to the user input 2. The device 1000 may display only messages received from John from among messages included in the "basketball team" chat window 2190. In addition, the device 1000 may receive a user input 3 for displaying messages of other users, which are included in the "basketball team" chat window 2190.

Figure 20B:
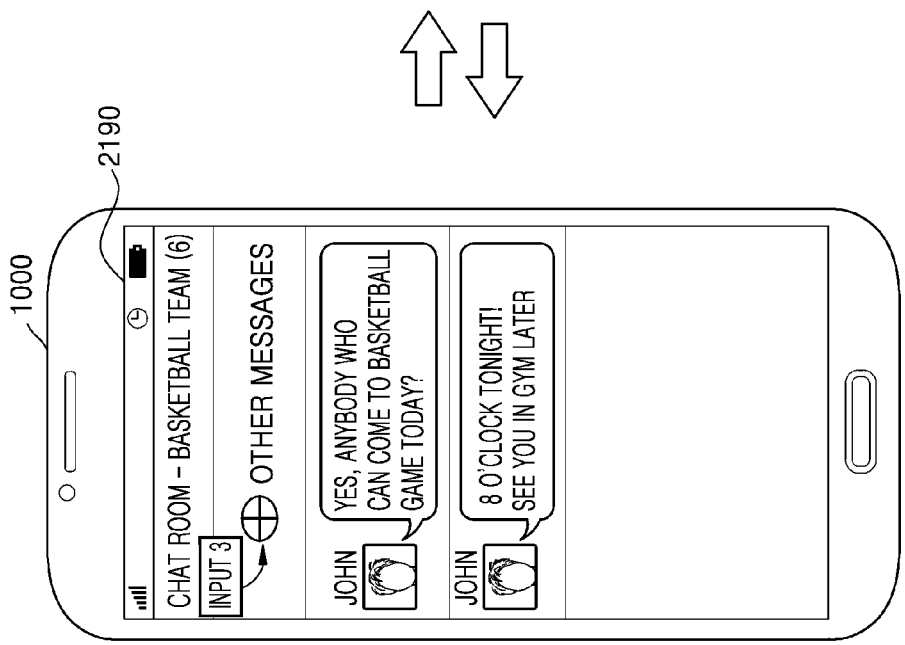

Referring to FIG. 20B, the device 1000 may display the messages of the other users including John, which are included in the "basketball team" chat window 2190, in response to the user input 3. For example, the device 1000 may display a message received from a user named Steve and the messages received from John in the "basketball team" chat window 2190. In addition, the device 1000 may receive a user input 4 for hiding messages of other users except for John, which are included in the "basketball team" chat window 2190. The device 1000 may hide the messages of the other users who are included in the "basketball team" chat window 2190 except for John, in response to the user input 4.

Figure 21:
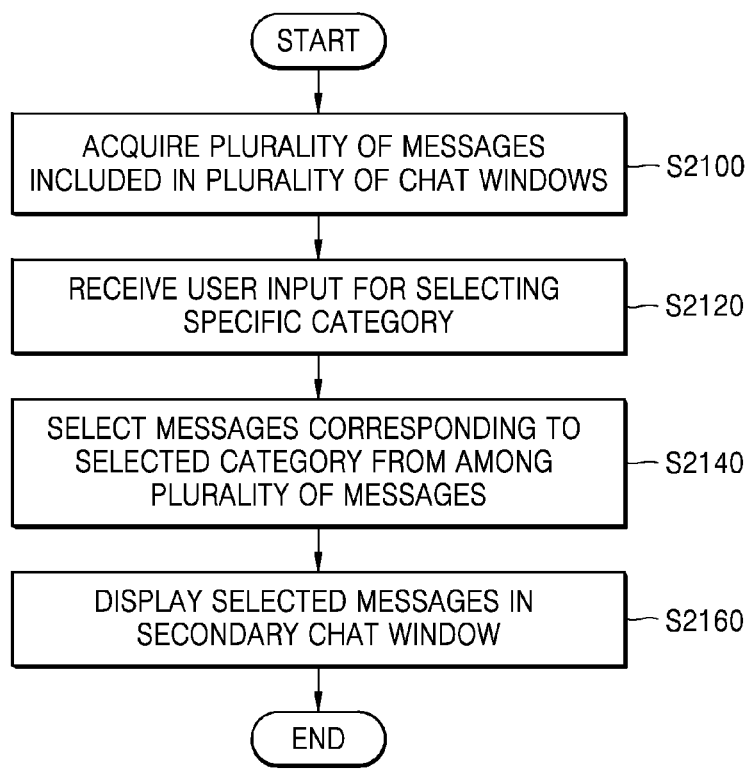
FIG. 21 is a flowchart of a method of classifying and displaying, in the secondary chat window, messages included in a chat window for each category, according to some exemplary embodiments.

FIG. 21 is a flowchart of a method of classifying and displaying, in the secondary chat window 3000, messages included in a primary chat window for each category, according to some exemplary embodiments.

In operation S2100, the device may acquire a plurality of messages included in a plurality of chat windows.

In operation S2120, the device may receive a user input for selecting a specific category. The device 1000 may display a category list to receive a user input for selecting a category for the secondary chat window 3000 before generating the secondary chat window 3000. In addition, the device 1000 may receive a user input for selecting the specific category from the displayed category list. Categories included in the category list may be chosen by the user but are not limited thereto, and may be set by the device 1000 as a default.

In operation S2140, the device may select messages corresponding to the selected category from among the plurality of messages. The device 1000 may determine categories to which the plurality of messages belong by analyzing the meaning of the plurality of messages. In addition, the device 1000 may select the messages corresponding to the category selected in operation S2120 from among the plurality of messages, based on the determined categories of the plurality of messages.

In operation S2160, the device 1000 may display the selected messages in the secondary chat window 3000. The device 1000 may generate the secondary chat window 3000 in which an identification value of the selected category is displayed and display the selected messages in the generated secondary chat window 3000. The device 1000 may classify and display the messages of the selected category for each of other users.

In addition, the device 1000 may display the messages in the secondary chat window 3000 in a preset order. For example, the device 1000 may first display a message including an identification value of the user more than the other messages or a message including a preset keyword from among the messages to be displayed in the secondary chat window 3000. However, the order of the messages displayed in the secondary chat window 3000 is not limited thereto.

In addition, the device 1000 may generate the secondary chat window 3000 for each category and display secondary chat windows 3000 according to preset priorities. For example, the device 1000 may display a plurality of secondary chat windows 3000 in a predetermined order based on the number of messages included in a category or the number of times the identification value of the user is included in messages included in a category, for each category. However, the order of displaying the secondary chat windows 3000 is not limited thereto.

FIGS. 22A through 22C illustrate classifying messages included in a primary chat window for each category and generating a secondary chat window 3200 for each category, according to some exemplary embodiments.

In FIG. 22A, the device 1000 may receive messages through each of a plurality of primary chat windows and display a chat window list on the screen of the device 1000.

In FIG. 22B, the device 1000 may classify, for each category, a plurality of messages received through the plurality of primary chat windows and generate a secondary chat window for each category. In addition, the device 1000 may display a list of secondary chat windows on the screen of the device 1000. The list of the secondary chat windows may include a category name (e.g., "sports" or "food") and names of other users who transmitted messages included in the corresponding category, as an identification value of each category. In addition, the device 1000 may receive a user input 4 for selecting "sports" from the list of the secondary chat windows.

As shown in FIG. 22C, the device 1000 may select a plurality of messages included in a category, "sports," in response to the user input 4 and then display the selected plurality of messages in the secondary chat window 3200.

FIGS. 23A through 23C illustrate the device 1000 displaying a secondary chat window 3230 when a preset event occurs while performing a predetermined operation, according to some exemplary embodiments.

Referring to FIG. 23A, when a preset event occurs in a "calling state", the device 1000 may generate a phrase informing about the occurrence of an event and display the generated phrase on a display. In addition, the device 1000 may provide, to the user, a menu for selecting a method of processing a message related to the occurred event together with the generated phrase. For example, the device 1000 may display a menu including "ignore a message", "hang up and then check a message", and "suspend the call and check a message" on the screen of the device 1000. In addition, for example, the device 1000 may receive a user input 5 for selecting "suspend the call and check a message."

In FIG. 23B, the device 1000 may change the "calling state" to the "call suspended state" in response to the user input 5. In addition, the device 1000 may display a phrase indicating that the event which has occurred during a call is an event related to "a message in which the user is mentioned.". In addition, the device 1000 may receive a user input 6 for selecting the displayed phrase.

According to an exemplary embodiment, when a plurality of events occur, the device 1000 may display a phrase indicating each of the plurality of events. The device 1000 may display events having higher priority or display the events in the order of occurrence.

In FIG. 23C, the device 1000 may display the secondary chat window 3230 for displaying a message related to the occurred event on the screen of the device 1000 in response to the user input 6.

According to an exemplary embodiment, when a plurality of events occur, the device 1000 may receive a user input for selecting any one of the displayed plurality of events. The device 1000 may display, on the screen of the device 1000, a secondary chat window for displaying a message related to the event corresponding to the user input.

Figure 24:
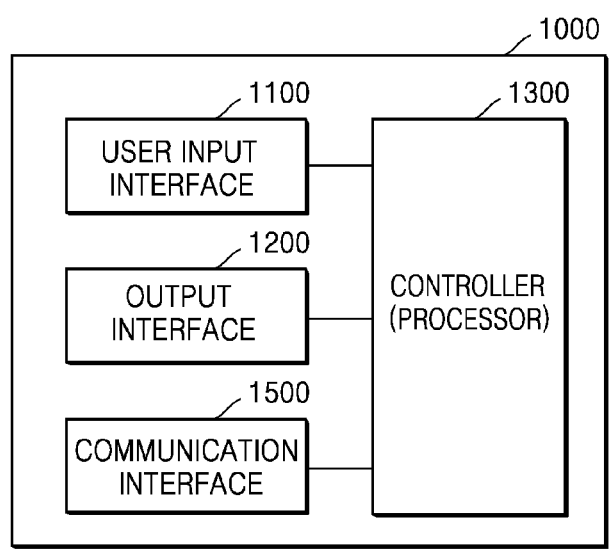
FIGS. 24 and 25 are block diagrams of configurations of a device according to some exemplary embodiments.
Figure 25:
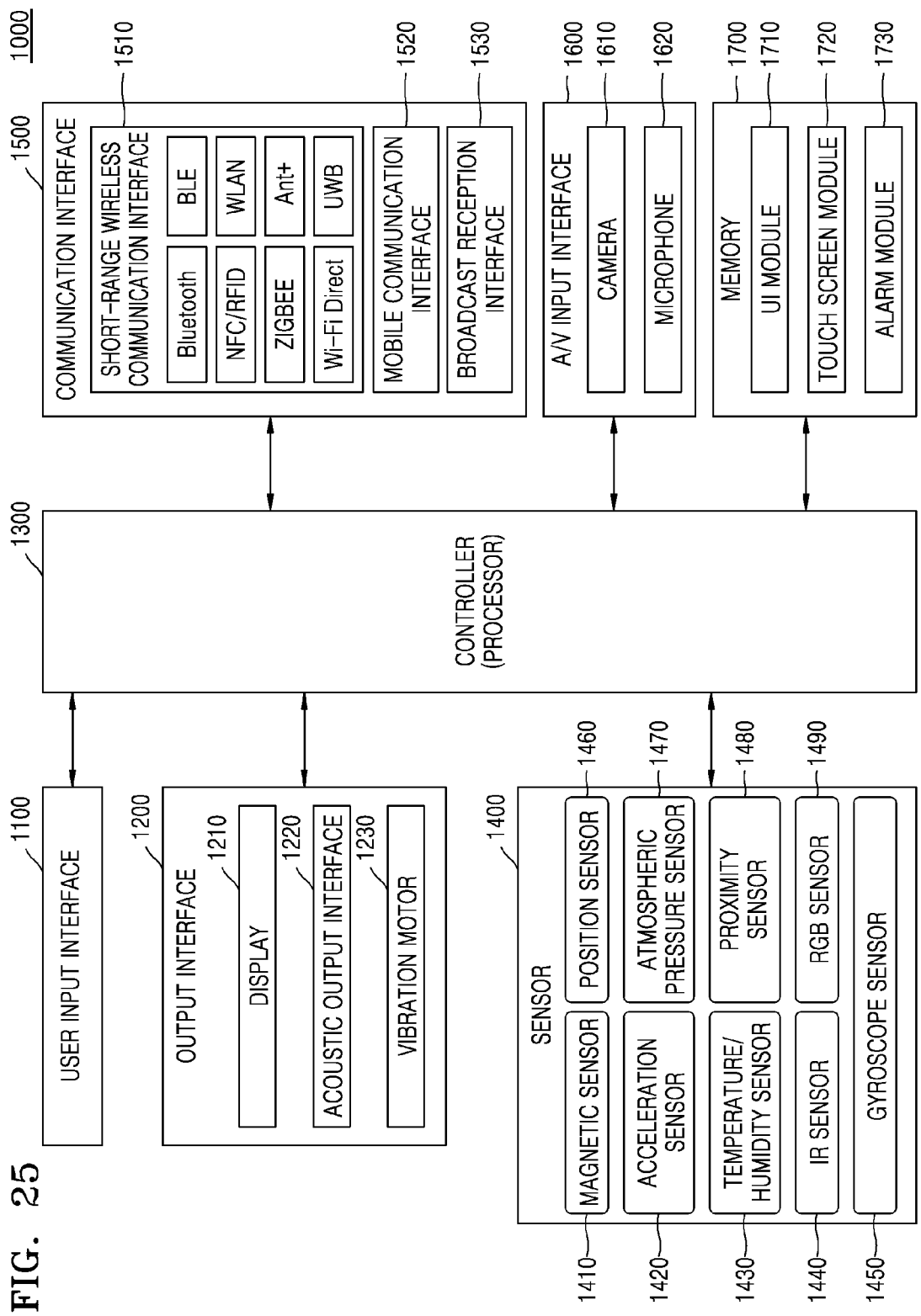

FIGS. 24 and 25 are block diagrams of configurations of the device 1000 according to some exemplary embodiments.

As shown in FIG. 24, the device 1000 according to some exemplary embodiments may include a user input interface 1100, an output interface 1200, a controller 1300, and a communication interface 1500. However, not all of the components shown in FIG. 24 are mandatory components of the device 1000. The device 1000 may be implemented with more or fewer components than the components shown in FIG. 24.

For example, as shown in FIG. 25, the device 1000 according to some exemplary embodiments may further include a sensor 1400, an audio/video (A/V) input interface 1600, and a memory 1700 associated with the user input interface 1100, the output interface 1200, the controller 1300, and the communication interface 1500.

The user input interface 1100 may include various means through which the user input data for controlling the device 1000. For example, the user input interface 1100 may include a keypad, a dome switch, a touch pad (e.g., a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto.

The user input interface 1100 may receive a user input through the primary chat window and/or the secondary chat window 3000. For example, the user input interface 1100 may receive a user input for inputting a message, through the secondary chat window 3000.

The output interface 1200 may output an audio signal, a video signal, or a vibration signal, and may include a display 1210, an acoustic output interface 1220, and a vibration motor 1230.

The display 1210 may display information processed by the device 1000. For example, the display 1210 may display a primary chat window and the secondary chat window 3000. In addition, the display 1210 may display information regarding messages included in the primary chat window and the secondary chat window 3000.

The acoustic output interface 1220 may output audio content received through the communication interface 1500 or stored in the memory 1700. In addition, the acoustic output interface 1220 may output an acoustic signal related to a function (e.g., a call signal reception sound, a message reception sound, or an alarm sound) performed by the device 1000. The acoustic output interface 1220 may include a speaker, a buzzer, and the like.

The vibration motor 1230 may output a vibration signal. For example, the vibration motor 1230 may output a vibration signal corresponding to an output of audio data or video data (e.g., a call signal reception sound or a message reception sound). In addition, the vibration motor 1230 may output a vibration signal when a touch is input through a touch screen.

The controller 1300 may commonly control a general operation of the device 1000. For example, the controller 1300 may generally control the user input interface 1100, the output interface 1200, the sensor 1400, the communication interface 1500, the A/V input interface 1600, and the like by executing programs stored in the memory 770.

The controller 1300 may perform the operations of the device 1000, which are disclosed with respect to FIGS. 1 through 23C, by executing the program instructions stored in the memory 770.

In detail, the controller 1300 may transmit and receive messages to and from other devices through at least one chat window provided by a chat application installed in the device 1000, analyze the messages in the chat window, and provide information regarding the analyzed messages to the user of the device 1000 by using the secondary chat window 3000.

The controller 1300 may display the chat window list 2000 on the screen of the device 1000, wherein the chat window list 2000 may include an identification value of at least one chat window.

The controller 1300 may display, in the secondary chat window 3000, information regarding messages in the at least one chat window included in the chat window list 2000. The controller 1300 may analyze the messages in the at least one chat window, generate guidance information about the messages in the at least one chat window, and display the generated guidance information in the secondary chat window 3000. The controller 1300 may generate the secondary chat window 3000 for displaying the guidance information and display the guidance information in the secondary chat window 3000 in an interactive form. In addition, the controller 1300 may receive a user input through the secondary chat window 3000 and generate a recommended response message based on the received user input.

The controller 1300 may acquire a plurality of messages included in the at least one primary chat window. The controller 1300 may transmit and receive messages to and from other devices through a chat window and monitor the messages transmitted and received through the chat window. The controller 1300 may identify whether the acquired messages have been read by the user of the device 1000. In addition, the controller 1300 may acquire, from a chat window, messages from other devices for a preset time duration.

In addition, the controller 1300 may determine that a preset event has occurred, based on the acquired plurality of messages. The controller 1300 may determine that the preset event has occurred, based on a message received from another device but not yet read by the user of the device 1000 from among messages in a chat window. The controller 1300 may change the preset event by receiving a user input for changing an event. In addition, the controller 1300 may generate the secondary chat window 3000 for informing the user about the occurred event. The controller 1300 may set the user of the device 1000 and the device 1000 itself as participants in the chat room of the secondary chat window 3000. The controller 1300 may match (i.e., associate) a plurality of primary chat windows with the secondary chat window 3000 and generate the secondary chat window 3000 to inform the user of information regarding events respectively occurring in the plurality of primary chat windows.

When the preset event has occurred, the controller 1300 may automatically generate the secondary chat window 3000 but is not limited thereto. When the preset event has occurred, the controller 1300 may display a GUI for asking the user if the user wishes to receive guidance information through the secondary chat window 3000, and generate the secondary chat window 3000 if a user input for receiving guidance information is input through the GUI.

In addition, the controller 1300 may display guidance information about the occurred event in the secondary chat window 3000.

The controller 1300 may set events for each category. The controller 1300 may select a predetermined category by receiving a user input and set a predetermined event related to the selected category.

In addition, the controller 1300 may identify a keyword included in at least one message. The controller 1300 may identify at least one keyword from messages acquired from at least one chat window. The controller 1300 may identify a keyword from a message according to an event set in the device 1000.

In addition, the controller 1300 may analyze the meaning of a message including a keyword. The controller 1300 may analyze the meaning of a message including a keyword related to an event from among messages in a chat window. In addition, the controller 1300 may analyze the meaning of a few messages displayed before and after a message including the keyword related to an event from among messages in a chat window.

In addition, the controller 1300 may determine the occurrence of a preset event. The controller 1300 may determine whether the preset event has occurred in a primary chat window, based on the meaning of an analyzed message. For example, the controller 1300 may determine which category of events a message is related to, based on the meaning of the message and determine which event among the events in the determined category has occurred associated with the message.

The controller 1300 may display a summary message of an occurred event. The controller 1300 may generate a summary message of an occurred event and display the generated summary message in the secondary chat window 3000. The controller 1300 may generate a summary message of an occurred event by analyzing the meaning of at least one message which has caused the occurrence of the event.

In addition, the controller 1300 may display a comment message related to the occurred event.

In addition, the controller 1300 may display search information about the occurred event. The controller 1300 may search for information related to the occurred event and display retrieved search information in the secondary chat window 3000. In addition, the controller 1300 may edit or modify the retrieved search information and display the edited information in the secondary chat window 3000.

In addition, the controller 1300 may display a recommended response message related to the occurred event.

The controller 1300 may be implemented with one or more processors (e.g., central processing units (CPUs)) or virtual processors capable of performing computations, executing instructions, and controlling other components in the device 1000.

The sensor 1400 may detect a state of the device 1000 or an ambient state of the device 1000 and transmit the detected information to the controller 1300.

The sensor 1400 may include a magnetic sensor 1410, an acceleration sensor 1420, a temperature/humidity sensor 1430, an IR sensor 1440, a gyroscope sensor 1450, a location sensor (e.g., global positioning system (GPS)) 1460, an atmospheric pressure sensor 1470, a proximity sensor 1480, and/or an RGB (illuminance) sensor 1490, but is not limited thereto. A function of each sensor may be intuitively inferred by those of ordinary skill in the art from a name thereof, and thus a detailed description thereof is omitted herein.

The communication interface 1500 may include at least one component for communicating between the device 1000 and other devices. For example, the communication interface 1500 may include a short-range wireless communication interface 1510, a mobile communication interface 1520, and a broadcast reception interface 1530.

The short-range wireless communication interface 1510 may include a Bluetooth communication interface, a Bluetooth low energy (BLE) communication interface, a near-field communication (NFC) interface, a wireless local area network (WLAN or Wi-Fi) communication interface, a Zigbee communication interface, an infrared data association (IrDA) communication interface, Wi-Fi Direct (WFD) communication interface, an ultra-wideband (UWB) communication interface, an Ant+ communication interface, and the like but is not limited thereto.

The mobile communication interface 1520 may transmit and receive a wireless signal to and from a base station, an external terminal, and/or a server in a mobile communication network. Herein the wireless signal may include a voice call signal, a video call signal, or various types of data according to text/multimedia message transmission and reception.

The broadcast reception interface 1530 may receive a broadcast signal and/or broadcast related information from the outside through a broadcast channel, and the broadcast channel may include a satellite channel and a terrestrial channel.

The A/V input interface 1600 may be used to input an audio signal or a video signal and may include a camera 1610, a microphone 1620, and the like. The camera 1610 may obtain an image frame of a still image, a moving picture, or the like through an image sensor in a video call mode or an image capturing mode. An image captured through the image sensor may be processed by the controller 1300 or a separate image processor.

The image frame processed by the camera 1610 may be stored in the memory 1700 or transmitted to an external device through the communication interface 1500. Two or more cameras 1610 may be prepared according to configuration aspects of the device 1000.

The microphone 1620 may receive an external acoustic signal and convert the external acoustic signal into electrical voice data. For example, the microphone 1620 may receive an acoustic signal from an external device or a speaker. The microphone 1620 may use various noise cancellation algorithms to cancel noise generated during a process of receiving an external acoustic signal.

The memory 1700 may store programs (i.e., software) for processing and control of the controller 1300 and store data input to the device 1000 or output from the device 1000.

The memory 1700 may include a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and/or an optical disc.

The programs or instructions stored in the memory 1700 may be classified into a plurality of modules according to functions thereof, e.g., a user interface (UI) module 1710, a touch screen module 1720, an alarm module 1730, and the like.

The UI module 1710 may provide a specified UI, a specified GUI, or the like interoperating with the device 1000 for each application. The touch screen module 1720 may sense a touch gesture of the user on the touch screen and transmit information regarding the touch gesture to the controller 1300. According to some exemplary embodiments, the touch screen module 1720 may recognize and analyze a touch code. The touch screen module 1720 may be configured by separate hardware including a controller.

Some exemplary embodiments may be implemented in a form of a recording medium including computer-executable instructions such as a program module executed by a computer system. A non-transitory computer-readable medium may be a medium which may be accessed by a computer system and may include all types of volatile and nonvolatile media and independent and non-independent media. In addition, the non-transitory computer-readable medium may include all types of computer storage media and communication media. The computer storage media include all types of volatile and nonvolatile and separated and non-separated media implemented by various methods and techniques for storing information such as computer-readable instructions, a data structure, a program module, or other data. The communication media typically include computer-readable instructions, a data structure, a program module, other data of a modulated signal such as a carrier, other transmission mechanism, and arbitrary information delivery media.

In addition, in the present specification, an "interface" or a component described with a suffix "-er(or)" may indicate a hardware component such as a processor or a circuit and/or a software component executed by a hardware component such as a processor.

The exemplary embodiments described above are only illustrative, and it will be understood by those of ordinary skill in the art that various changes in form and details may be made therein without changing the technical spirit and mandatory features of the inventive concept. Therefore, the exemplary embodiments should be understood in the illustrative sense only and not for the purpose of limitation in all aspects. For example, each component described as a single type may be carried out by being distributed, and likewise, components described as a distributed type may also be carried out by being coupled.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. A method, performed by a device, of providing information regarding at least one primary chat window, the method comprising:

acquiring a plurality of messages included in the at least one primary chat window;

determining that a specific event has occurred, based on the acquired plurality of messages;

generating a secondary chat window for informing a user of the device about the specific event;

displaying guidance information about the specific event in the secondary chat window;

receiving a response input responding to the specific event from the user through the secondary chat window;

generating a recommended response message related to the specific event by creating a new phrase based on the response input;

displaying the generated recommended response message in the secondary chat window;

receiving another response input from the user for selecting the recommended response message; and transmitting, through a chat window including a message related to the specific event, the selected recommended response message to another user in the chat window, wherein the secondary chat window comprises a summary message that summarizes the information regarding the at least one primary chat window.

2. The method of claim 1, wherein the displaying the guidance information about the specific event comprises displaying the guidance information in the secondary chat window in an interactive form.

3. The method of claim 1, wherein the displaying the guidance information about the specific event comprises:

generating the summary message that is related to the specific event; and displaying the generated summary message in the secondary chat window, wherein the summary message comprises:

an identification value of at least one other user who has transmitted the message related to the specific event, and a phrase describing the specific event.

4. The method of claim 3, wherein the phrase describing the specific event is determined according to a speech pattern of the at least one other user.

5. The method of claim 3, wherein the summary message further comprises an identification value of a group including a plurality of other users, and the phrase describing the specific event.

6. The method of claim 1, wherein the displaying the guidance information about the specific event comprises:

generating a comment message related to the specific event based on schedule information about the user; and displaying the generated comment message in the secondary chat window.

7. The method of claim 1, wherein the displaying the guidance information about the specific event comprises:

searching for information related to the specific event based on a keyword in the message related to the specific event; and displaying retrieved information in the secondary chat window.

8. A device comprising:
a display;
a processor; and
a memory configured to store instructions which, when executed by the processor, cause the processor to:

provide information regarding at least one primary chat window through the display, acquire a plurality of messages included in the at least one primary chat window, determine that a specific event has occurred, based on the acquired plurality of messages, generate a secondary chat window for informing a user of the device about the specific event, display guidance information about the specific event in the secondary chat window, receive a response input responding to the specific event from the user through the secondary chat window, generate a recommended response message related to the specific event by creating a new phrase based on the response input, display the generated recommended response message in the secondary chat window, receive another response input from the user for selecting the recommended response message, and transmit, through a chat window including a message related to the specific event, the selected recommended response message to another user in the chat window, wherein the secondary chat window comprises a summary message that summarizes the information regarding the at least one primary chat window.

9. The device of claim 8, wherein the memory is further configured to store additional instructions which, when executed by the processor, cause the processor to:

generate the summary message that is related to the specific event, and display the generated summary message in the secondary chat window, wherein the summary message comprises:

an identification value of at least one other user who has transmitted the message related to the specific event, and a phrase describing the specific event.

10. The device of claim 9, wherein the phrase describing the specific event is determined according to a speech pattern of the at least one other user.

11. The device of claim 9, wherein the summary message further comprises an identification value of a group including a plurality of other users, and the phrase describing the specific event.

12. The device of claim 8, wherein the memory is further configured to store additional instructions which, when executed by the processor, cause the processor to:

generate a comment message related to the specific event by using schedule information about the user; and display the generated comment message in the secondary chat window.

13. The device of claim 8, wherein the memory is further configured to store additional instructions which, when executed by the processor, cause the processor to:

search for information related to the specific event by using a keyword in the message related to the specific event; and display retrieved information in the secondary chat window.

14. A non-transitory computer-readable recording medium having recorded thereon a computer-executable program for performing a method comprising:

acquiring a plurality of messages included in at least one primary chat window;
determining that a specific event has occurred, based on the acquired plurality of messages;
generating a secondary chat window for informing a user about the specific event;
displaying guidance information about the specific event in the secondary chat window;
receiving a response input responding to the specific event from the user through the secondary chat window;
generating a recommended response message related to the specific event by creating a new phrase based on the response input;
displaying the generated recommended response message in the secondary chat window;
receiving another response input from the user for selecting the recommended response message; and
transmitting, through a chat window including a message related to the specific event, the selected recommended response message to another user in the chat window,
wherein the secondary chat window comprises a summary message that summarizes information regarding the at least one primary chat window.

* * * * *